(12) United States Patent
Marcinkiewicz

(10) Patent No.: US 11,854,527 B2
(45) Date of Patent: Dec. 26, 2023

(54) ELECTRONIC DEVICE AND METHOD OF CONTROLLING SPEECH RECOGNITION BY ELECTRONIC DEVICE

(71) Applicant: SAMSUNG ELECTRONICS CO., LTD., Suwon-si (KR)

(72) Inventor: Piotr Marcinkiewicz, Warsaw (PL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 121 days.

(21) Appl. No.: 17/399,852

(22) Filed: Aug. 11, 2021

(65) Prior Publication Data

US 2021/0375265 A1    Dec. 2, 2021

Related U.S. Application Data

(63) Continuation of application No. 16/444,019, filed on Jun. 18, 2019, now Pat. No. 11,094,313.

(30) Foreign Application Priority Data

Mar. 19, 2019   (KR) .................. 10-2019-0031198

(51) Int. Cl.
*G10L 15/02*   (2006.01)
*G06F 40/40*   (2020.01)

(52) U.S. Cl.
CPC .............. *G10L 15/02* (2013.01); *G06F 40/40* (2020.01); *G10L 2015/025* (2013.01)

(58) Field of Classification Search
CPC ... G10L 15/02; G10L 2015/025; G10L 25/78; G10L 25/63; G10L 13/033; G10L 15/22; G10L 25/03; G06F 40/40; G06F 3/165
See application file for complete search history.

(56) References Cited

U.S. PATENT DOCUMENTS

| | | | |
|---|---|---|---|
| 10,276,149 B1* | 4/2019 | Liang | G10L 13/033 |
| 10,276,185 B1* | 4/2019 | Ma | G10L 25/78 |
| 2004/0239526 A1 | 12/2004 | Nakajima | |
| 2005/0080626 A1 | 4/2005 | Marumoto et al. | |
| 2006/0036439 A1* | 2/2006 | Haritaoglu | G10L 21/0364 |
| | | | 704/E21.009 |
| 2014/0222432 A1 | 8/2014 | Ahn et al. | |
| 2015/0016801 A1 | 1/2015 | Homma et al. | |
| 2017/0255616 A1 | 9/2017 | Yun et al. | |
| 2018/0182373 A1 | 6/2018 | Almudafar-Depeyrot et al. | |

FOREIGN PATENT DOCUMENTS

| | | | |
|---|---|---|---|
| EP | 2051241 A | | 4/2009 |
| JP | H09152889 A | * | 6/1997 |
| JP | 199231885 A | | 8/1999 |
| JP | 2003263200 A | | 9/2003 |
| JP | 2004-348657 A | | 12/2004 |

(Continued)

OTHER PUBLICATIONS

Communication dated Dec. 10, 2021 issued by the European Patent Office in European Application No. 19920439.7.

(Continued)

*Primary Examiner* — Fan S Tsang
*Assistant Examiner* — David Siegel
(74) *Attorney, Agent, or Firm* — Sughrue Mion, PLLC

(57) ABSTRACT

An electronic device for adjusting a speech output rate (speech rate) of speech output data.

10 Claims, 20 Drawing Sheets

(56) References Cited

FOREIGN PATENT DOCUMENTS

JP          2005-3390 A      1/2005
JP          2007-187799 A    7/2007

OTHER PUBLICATIONS

Alan W. Black & Kevin A. Lenzo, "Building Synthetic Voices", FestVox 2.7 Edition, 1999-2014, pp. 1-202 (208 total pages).
Eric Moulines & Francis Charpentier, "Pitch-Synchronous Waveform Processing Techniques for Text-To-Speech Synthesis Using Diphones", Centre National d'Etudes des Telecommunications, vol. 9 No. 5/6, Dec. 1990, pp. 453-467 (15 pages total).
International Search Report (PCT/ISA/210) dated Dec. 17, 2019 by the International Searching Authority in counterpart International Patent Application No. PCT/KR2019/007357.
Written Opinion (PCT/ISA/237) dated Dec. 17, 2019 by the International Searching Authority in counterpart International Patent Application No. PCT/KR2019/007357.
Notice of Allowance issued in parent U.S. Appl. No. 16/444,019 dated Apr. 21, 2021.
Non-Final Office Action issued in parent U.S. Appl. No. 16/444,019 dated Dec. 22, 2020.

\* cited by examiner

ELECTRONIC DEVICE AND METHOD OF CONTROLLING SPEECH RECOGNITION BY ELECTRONIC DEVICE

CROSS-REFERENCE TO RELATED APPLICATION(S)

This application is a continuation of U.S. application Ser. No. 16/444,019 filed on Jun. 18, 2019, which is based on and claims priority under 35 U.S.C. § 119 to Korean Patent Application No. 10-2019-0031198, filed on Mar. 19, 2019, in the Korean Intellectual Property Office, the disclosure of which is herein incorporated by reference in its entirety.

FIELD

The disclosure relates to an electronic device and a method of controlling speech recognition using an electronic device.

DESCRIPTION OF RELATED ART

An artificial intelligence (AI) system is a computer system for implementing human-level intelligence. The AI system may learn by itself, make decisions by itself, and further improve a recognition rate as the AI system is iteratively used.

Artificial intelligence technology includes machine-learning (for example, deep-learning) technology, which uses an algorithm for classifying or learning features of input data and another algorithm composed of element technologies for copying cognition and decision functions of the human brain.

Element technologies may include at least one of language understanding technology for recognizing human languages or characters, visual understanding technology for recognizing objects through a system like human vision, inference or prediction technology for determining information and performing logical inferences and predictions, a knowledge representation technology for processing human experience information into knowledge data, and a motion control technology for controlling autonomous driving of vehicles or motions of robots.

Language understanding corresponds to a technology for recognizing and applying or processing human language or text and may include natural language processing, machine translation, conversation systems, question-and-answer processing, as well as speech recognition or synthesis.

Visual understanding corresponds to a technology for recognizing objects through a system like human vision and processing the same, and may include object recognition, object tracking, image search, person recognition, scene understanding, space understanding, and image improvement.

Inference and prediction corresponds to a technology for determining information and logically inferring and predicting the same, and may include knowledge or probability-based inference, optimization prediction, preference-based planning, and recommendation.

Knowledge representation corresponds to a technology for automatically processing human experience information into knowledge data and may include knowledge construction (for example, data creation or classification) and knowledge management (for example, the use of data).

Motion control corresponds to a technology for controlling autonomous driving of vehicles or motion of robots, and may include motion control (for example, navigation, impulsion, or driving) and manipulation control (for example, behavior control).

SUMMARY

An electronic device having a speech recognition function may acquire an utterance from a user and, when the utterance contains a preset word (for example, a wake-up word), switch the mode of the electronic device to a command execution mode to perform a relevant operation for the command contained in the utterance. For example, a method of identifying whether the acquired utterance contains the preset word may include at least one of a method of analyzing an audio characteristic of the acquired utterance and comparing the same with an audio characteristic of the stored utterance and a method of converting the acquired utterance into a character string (Speech-To-Text (STT)) and comparing the converted character string with the preset word.

In various examples, the electronic device (for example, a smart phone or a smart speaker) having the speech recognition function may be referred to as a voice assistant, and may acquire a user's utterance through a microphone. A speech response may be output through a speaker in response to the user's utterance. At this time, when outputting the speech response, the electronic device having the speech recognition function may output a speech signal at a fixed speech output rate (speech rate), which may provide an unnatural interaction experience between the user and the electronic device.

Various embodiments of the disclosure provide an electronic device and a method of controlling speech recognition by an electronic device that, when outputting a speech response through an electronic device having a speech recognition function, outputs the speech response at a speech output rate adjusted according to various preset conditions.

In accordance with an aspect of the disclosure, there is provided an electronic device including: a speaker; a microphone; a processor; and a memory that stores computer-readable instructions, wherein the processor, when executing the computer-readable instructions, is configured to control the electronic device to receive a speech input signal through the microphone, obtain speech output data to be output in response to the received speech input signal, identify a specific condition for an adjustment of a speech rate of the speech output data, generate a speech signal of the speech output data having an adjusted speech rate based at least in part on the identified specific condition, and output the speech signal having the adjusted speech rate through the speaker.

In accordance with an aspect of the disclosure, there is provided a method of controlling speech recognition by an electronic device including: receiving a speech input signal through a microphone; obtaining speech output data to be output in response to the received speech input signal; identifying a specific condition for an adjustment of a speech rate of the speech output data; generating a speech signal of the speech output data having an adjusted speech rate based at least in part on the identified specific condition; and outputting the speech signal having the adjusted speech rate through a speaker of the electronic device.

When a speech signal is output through an electronic device having a speech recognition function, the electronic device according to various embodiments may output the speech signal at a speech output rate adjusted according to various preset conditions, and thus the user can more easily understand and remember complex information in the output speech signal.

Further, when a speech signal is output through an electronic device having a speech recognition function, the electronic device according to various embodiments may prevent a repetitive request for information which the user desires by configuring a speech output rate of a particular word or a particular syllable to be slower than a speech output rate of another word or another syllable.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
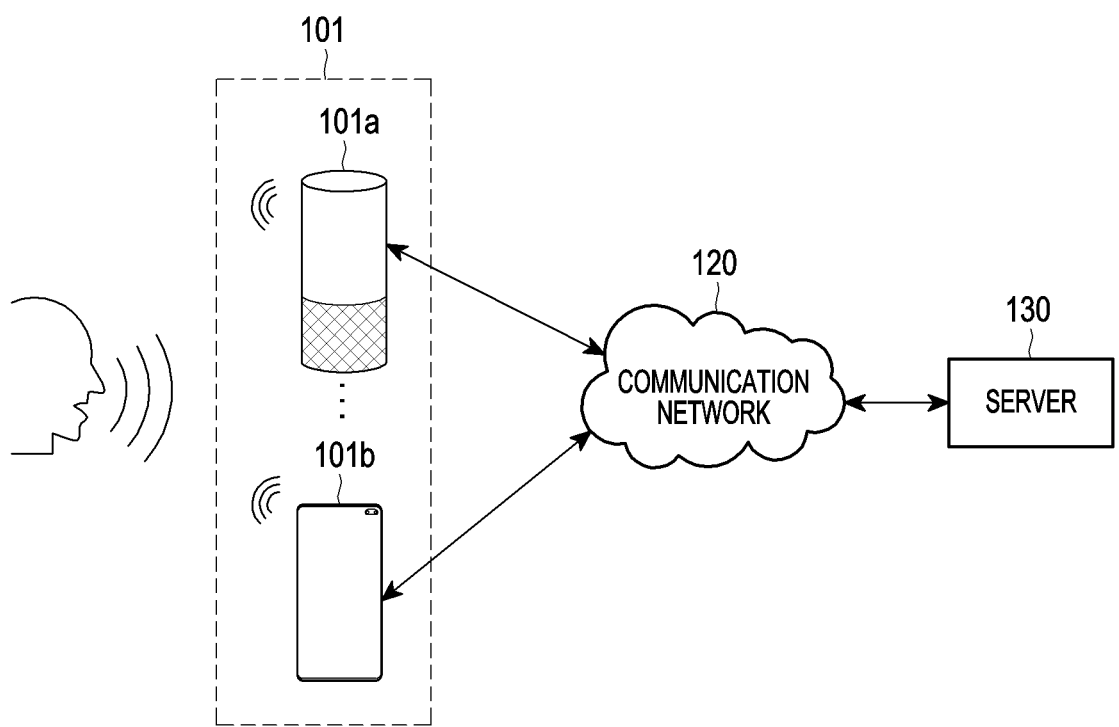
FIG. 1 illustrates a system environment according to an embodiment of the disclosure.

Hereinafter, embodiments of the disclosure will be described with reference to the accompanying drawings. The embodiments and the terms used therein are not intended to limit the technology disclosed herein to specific forms, and should be understood to include various modifications, equivalents, and alternatives to the corresponding embodiments. In describing the drawings, similar reference numerals may be used to designate similar constituent elements. A singular expression may include a plural expression unless different in a context. As used herein, singular forms may include plural forms unless the context clearly indicates otherwise. The expression "a first," "a second," "the first," or "the second" may modify various components regardless of the order or the importance, and is used merely to distinguish one element from any other element without limiting the corresponding elements. When an element (e.g., first element) is referred to as being (functionally or communicatively) "connected," or "directly coupled" to another element (second element), the element may be connected directly to the another element or connected to the another element through yet another element (e.g., third element). The expression "plural" may mean at least two.

The expression "configured to" as used in various embodiments of the disclosure may be interchangeably used with, for example, "suitable for," "having the capacity to," "designed to," "adapted to," "made to," or "capable of" in terms of hardware or software. For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that performs the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. The wearable device may include at least one of an accessory type device (e.g., a watch, a ring, a bracelet, an ankle bracelet, a necklace, a pair of glasses, a contact lenses, a head mounted device (HMD), or a head mounted display (HMD)), a fabric or clothing integrated device (e.g., electronic clothing), a body attachment device (e.g., a skin pad or tattoo), and a bio-implantable circuit. In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices, such as a blood glucose monitoring device, a heart rate monitoring device, a blood pressure measuring device, a body temperature measuring device, etc., a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship or a gyro-compass), avionics, security devices, an automotive head unit, a robot for home or industry, an automatic teller's machine (ATM) in banks, a point of sale (POS) in a shop, or an Internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, an electronic device may include at least one of a part of a piece of furniture or a building or structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

In the following embodiments, a smart phone or a smart speaker having a speech recognition function is described as an example of the electronic device, but the following embodiments are not limited thereto.

FIG. 1 illustrates a system environment according to an embodiment of the disclosure. Referring to FIG. 1, a system environment may include various types of electronic devices 101. The electronic device 101 may include, for example, a smart speaker 101a or a smart phone 101b, but is not limited thereto.

The electronic device 101 is an electronic device having a speech recognition function and may receive a speech signal spoken by a user through a microphone, recognize the input speech signal received through the microphone, and output the result of recognizing the speech signal through a speaker or display.

Speech recognition processing of the voice input signal may partially include Automatic Speech Recognition (ASR) and/or Natural Language Understanding (NLU) processing. According to various embodiments, the speech recognition processing may be performed by a speech recognition module implemented in the electronic device 101 or implemented by a server 130, or cooperatively by the electronic device 101 and the server 130.

For example, the speech input signal received through the microphone of the electronic device 101 or information corresponding to the speech input signal may be transmitted to the server 130 (for example, an intelligent server or a cloud server) through a communication network 120. The server 130 may perform speech recognition by performing ASR and/or NLU processing on the speech input signal received from the electronic device 101 or the information corresponding to the speech input signal. The speech recognition result processed by the server 130 may include at least one task or speech output data, and the speech recognition result generated by the server 130 may be transmitted to the corresponding electronic device 101 through a communication network 120. Detailed embodiments of the detailed speech recognition process and the speech recognition result processed by the electronic device 101 or the server 130 will be described below.

According to various embodiments, the speech recognition result processed by the electronic device 101 or the server 130 may include speech output data, and the speech output data may be output through the speaker of the electronic device 101. According to various embodiments, when outputting the speech output data through the speaker, the electronic device 101 may adjust a speech output rate (speech rate) according to a preset condition. For example, the electronic device 101 may adjust a speech output speed of all sentences of the speech output data, a speech output speed of at least one word included, or a speech output speed of at least one syllable or phoneme.

The speech output rate may be referred to as a speech rate, reproduction rate, or an utterance rate. For example, the speech output rate may be defined as the number of words per unit time, but the following embodiments are not limited thereto. According to various embodiments, when adjusting the speech output speed, the electronic device 101 may adjust the average speech output rate, for example by between 50% and 200%, and output the speech having the adjusted speech rate.

According to various embodiments, the electronic device 101 may adaptively adjust the speech output rate in consideration of user demands, skills, context, and external factors that may influence listening, understanding, and comprehension by the user. According to various embodiments, the electronic device 101 may learn how a user listens, understand, and comprehends a conversation between the user and the electronic device 101, and then adaptively adjust the speech output rate on the basis of the learning. For example, when information output through the speaker of the electronic device 101 is a sentence or a word that is hard to remember for the user, the electronic device 101 may adjust the output rate of the corresponding sentence or word to be slower than the normal output speed.

According to various embodiments, the electronic device 101 may acquire an utterance from the user, analyze the acquired utterance, and perform a relevant operation. According to various embodiments, the electronic device 101 may acquire a user's utterance and acquire a voiceprint from the acquired utterance, and thus identify, register, and authenticate the user. According to various embodiments, the electronic device 101 may adaptively adjust the speech output speed on the basis of the identity and/or authentication of the user.

The server 130 may perform a function of storing and managing user data. Further, the server 130 may store and manage information related to adjustment of the speech output rate of the speech output data to be output by the electronic device 101.

According to various embodiments, the server 130 may store, in a database, information on user's skills, an access level, user's age, learning skills, and ability of the user to remember specific information. When the user talks to the electronic device 101, when the user makes a request for repeating the information, when the user makes a request for reproducing the information more slowly, or when the user inquires about more detailed matters (for example, a number, an address, and a name) or request additional information related to the output of the electronic device 101, the server 130 may update a database included in the server 130 or a database managed by the server 130. According to various embodiments, when the electronic device 101 is required to provide at least some pieces of information, the electronic device 101 may adjust a speech output rate in consideration of configurations predefined in the database of the server 130 or learned user preferences.

According to various embodiments, when information output through the speaker is difficult for the user to understand, comprehend, or remember, or when the feature or essence of the information output by the electronic device 101 is complex, the electronic device 101 may adjust the rate of the speech output data to be output more slowly than an average data rate or a set reference rate. On the other hand, when the information to be output through the speaker is information that can be easily understood by the user, the electronic device 101 may output the information at the average output rate or adjust the output rate to be faster than the average output rate.

According to various embodiments, the electronic device 101 may dynamically change the speech output rate of the speech output data while providing information to the user. For example, the electronic device 101 may adjust the speech output rate to be slower as necessary or, when critical information is output, adjust the speech output rate to be faster. According to various embodiments, when the user makes a request for more slowly repeating some information, the electronic device 101 may recognize the request and adjust the speech output rate for output provided to the user. The electronic device 101 may also account for the user request and modify an output rate of future output to be provided to the user.

According to various embodiments, the electronic device 101 or the server 130 may analyze the speech output rate of the speech spoken by the user or moments at which the user emphasizes particular information in the speech. For example, when the speech output rate of the user is changed in some particular moments (for example, when the user speaks numbers), the electronic device 101 may perform output after adjusting the speech output rate of a corresponding word in consideration of the change.

According to various embodiments, the electronic device 101 or the server 130 may determine a user's age and accessibility on the basis of speech conversion of the user in the past and perform output after adjusting the speech output rate on the basis of the determined information. Further, the electronic device 101 or the server 130 may perform output after adjusting the speech output rate on the basis of user settings such as an access mode, age, or personal preference.

According to various embodiments, the electronic device 101 or the server 130 may perform output after adjusting the speech output rate on the basis of a situation or an external input. For example, the situation or the external input may include words spoken by the user, a change in complexity of transmitted information, and generation of noise that makes understanding of words difficult.

According to various embodiments, the electronic device 101 or the server 130 may determine when to change the speech output rate and to what extent to change the speech output rate. The speech output rate may be determined on the basis of predefined data or settings or determined according to the self-learning result by an Artificial Intelligence (AI) server (for example, the server 130).

According to various embodiments, the predefined data or settings may include, for example, an address, an email address, a number, or a word in a translated language. The self-learning result by the AI server may consider adjustment of an average speech output rate of the user, adjustment of a speech output rate of the user in particular moments, and the user's requests for speaking or pronouncing a word or sentence more slowly.

Figure 2:
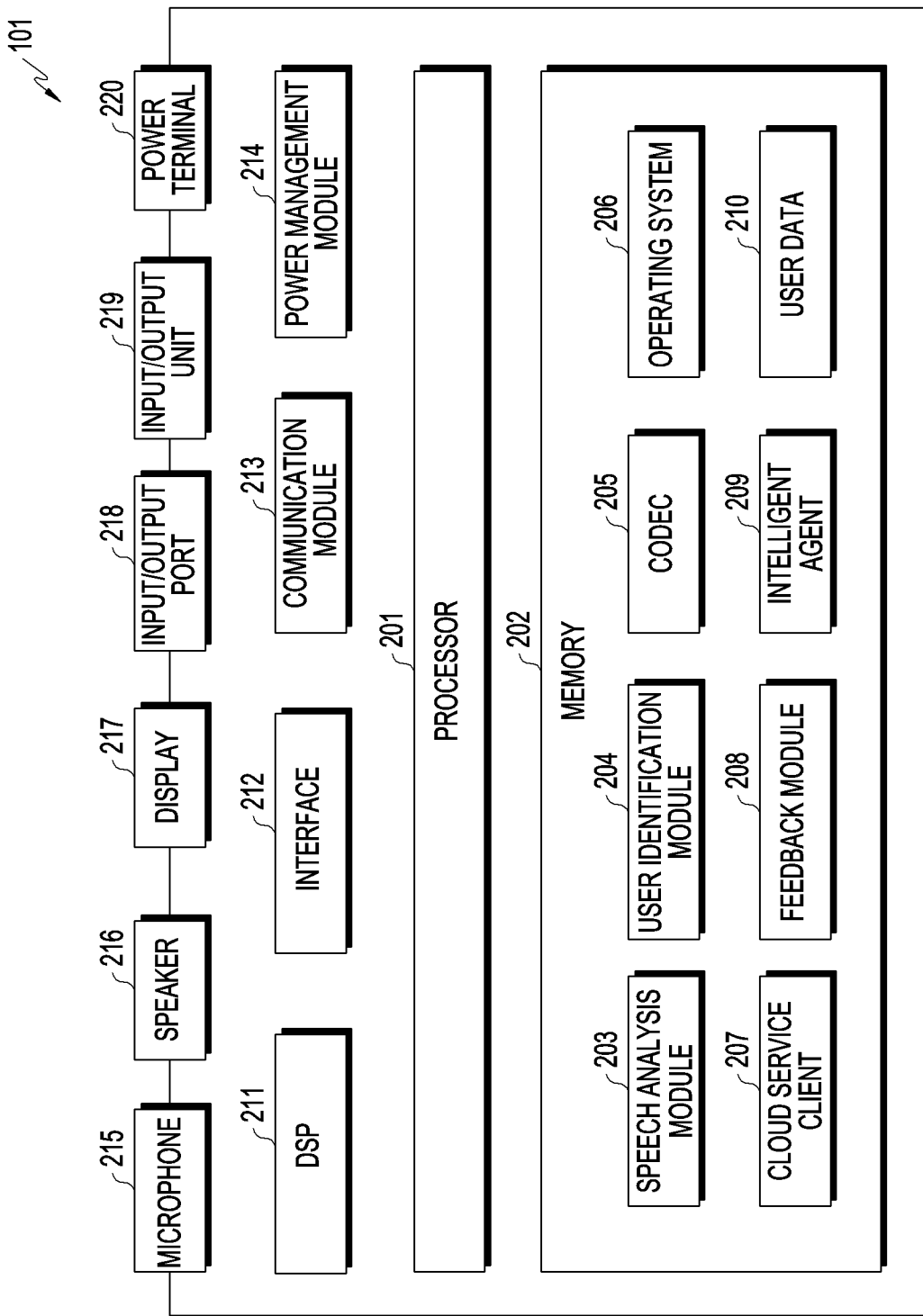
FIG. 2 is a block diagram illustrating a configuration of an electronic device according to an embodiment of the disclosure.

FIG. 2 is a block diagram illustrating a configuration of the electronic device 101 (for example, the smart speaker 101*a* or the smart phone 101*b*) according to an embodiment of the disclosure.

A processor 201 may control the electronic device 101 to perform a predetermined operation by controlling various elements of the electronic device 101. The processor 201 may be communicatively or electrically coupled to components of the electronic device 101 by one or more wires, busses, or other wired or wireless communication paths.

A memory 202 (memory unit) may store a voice analysis module 203, a user identification module 204, a codec 205, an operating system 206, a cloud service client 207, a feedback module 208, an intelligent agent 209, and user data 210. According to various embodiments, the memory 202 may store software executed by the processor 201 for controlling the electronic device 101 to perform various functions, data required for executing the software, and user data. The software may include at least one of an operating system, a framework, and an application. The data required for executing the software may include at least one piece of temporary data temporarily generated and used during driving of the software and program data generated and stored by driving the software. The user data may be content in various types generated or acquired by the user. For example, the user data may include at least one of music, videos, photos, and documents.

The voice analysis module 203 may acquire and analyze a user's utterance. The analysis may include at least one of acquiring a voiceprint from the utterance, storing the acquired voiceprint as an authentication voiceprint, and comparing the stored authentication voiceprint with an utterance voiceprint. Further, the analysis may include at least one function of extracting text from the speech (Speech-To-Text (STT)) and processing natural language or a function of performing at least one function and identifying the result thereof.

The user identification module 204 may manage a user account by which the electronic device 101 and a service linked to the electronic device 101 can be accessed. The user identification module 204 may store the user account and relevant information for authentication of the user account. The user identification module 204 may perform an authentication procedure on the user who desires to use the electronic device with reference to at least one of various authentication methods such as ID or password, device authentication, or voiceprint authentication.

The CODEC 205 may perform an operation of compressing and storing (coder, encoding) images or voice data and decompressing (decoder, decoding) the compressed images or voice data to output an analog signal. The codec 205 may be stored in the memory 202 in the form of software and may be driven by the processor 201. The codec 205 may be stored in the digital signal processor (DSP) 211 in the form of firmware and executed. The codec 205 may include at least one codec selected from video codecs such as MPEG, Indeo, DivX, Xvid, H.26x, WMV, RM, MOV, ASF, and RA or audio codecs such as MP3, AC3, AAC, OGG, WMA, FLAC, and DTS.

The operating system 206 may provide a basic function for the operation of the electronic device 101 and control the overall operation thereof. The operating system 206 may detect various events and perform operations corresponding to the events. The operating system 206 may install a third party application for performing an expansion function and provide an operating environment.

The cloud service client 207 may establish the connection between the electronic device 101 and the server 130 and perform a relevant operation. The cloud service client 207 may perform a function of synchronizing data stored in the electronic device 101 and data stored in the server 130. Further, the cloud service client 207 may receive a cloud service from the server 130. The cloud service may be an external third-party service having any of various forms including data storage or content streaming.

The feedback module 208 may create and generate feedback that the electronic device 101 provides to the user of the electronic device 101. The feedback may include at least one of sound feedback, visual feedback, LED feedback, vibration feedback, and a method of controlling part of the device.

The intelligent agent 209 may perform an intelligent function based on a user's utterance acquired through the electronic device 101, or may acquire the result of execution of the intelligent function through a link with an external intelligent service. The intelligent function may include at least one of ASR, STT, NLU, NLG, TTS, Action Planning, and Reasoning functions for recognizing and processing the user's utterance. According to various embodiments, the intelligent agent 209 may recognize the user's utterance acquired through the electronic device 101 and adjust a speech output rate (speech rate) of speech output data to be output through the speaker 216 on the basis of text extracted from the recognized utterance. The user data 210 may be data generated or acquired by the user or data generated or acquired by a function performed by the user.

The Digital Signal Processor (DSP) 211 may convert an analog image or an analog voice signal into a digital signal able to be processed by the electronic device or convert a stored digital image or digital voice signal into an analog signal that can be recognized by the user to perform output. In order to perform the operation at a high speed, the digital signal processor 211 may implement calculations required for the operation in the form of a circuit. The digital signal processor 211 may include the codec 205 or may perform an operation with reference to the codec 205.

An interface (interface unit) 212 may perform a function by which the electronic device 101 acquires input from the user, outputs information for the user, or exchanges information with an external electronic device. More specifically, the interface 212 may operate while being functionally connected to a microphone 215 and a speaker 216 for audio signal processing. In another example, the interface 212 may operate while being functionally connected to a display 217 to output information to the user. Further, the interface 212 may be functionally connected to an input/output port 218 and an input/output unit 219 in order to perform an input or output operation between the user or the external electronic device and the electronic device 101.

A communication module (network unit) 213 may allow the electronic device 101 to exchange information with an external device through a networking protocol. The networking protocol may include at least one of short-range communication protocols such as NFC, Bluetooth or BLE, ZigBee, and Z-Wave, and Internet Network Protocols such as TCP and UDP. The communication module 213 may support at least one of a wired communication network and a wireless communication network.

A power management module (power management unit) 214 may acquire power for driving the electronic device 101 from a power terminal 220 and supply power for driving the electronic device 101 by controlling the same. The power management module 214 may charge a battery of the electronic device 101 with power acquired from the power terminal 220. The power management module 214 may perform at least one operation of changing a voltage for the acquired power for driving or charging the electronic device 101, controlling DC or AC, controlling a current, or controlling a current circuit.

The microphone (MIC) 215 may acquire a sound signal from the user or the surrounding environment. The speaker 216 may output a sound signal. The display 217 may output an image.

The input/output port (I/O port) 218 may provide a means for the connection with an external electronic device to extend the function of the electronic device 101. The input/output port 218 may include at least one of an audio input port, an audio output port, a USB expansion port, and a LAN port.

The input/output unit (I/O unit) 219 may include various devices for acquiring input from the user and outputting information to the user. The input/output unit 219 may include at least one of a button, a touch panel, a wheel, a jog dial, a sensor, an LED, a vibration generation device, and a beep generation device. The power terminal 220 may receive AC or DC power for driving the electronic device 101.

Figure 3:
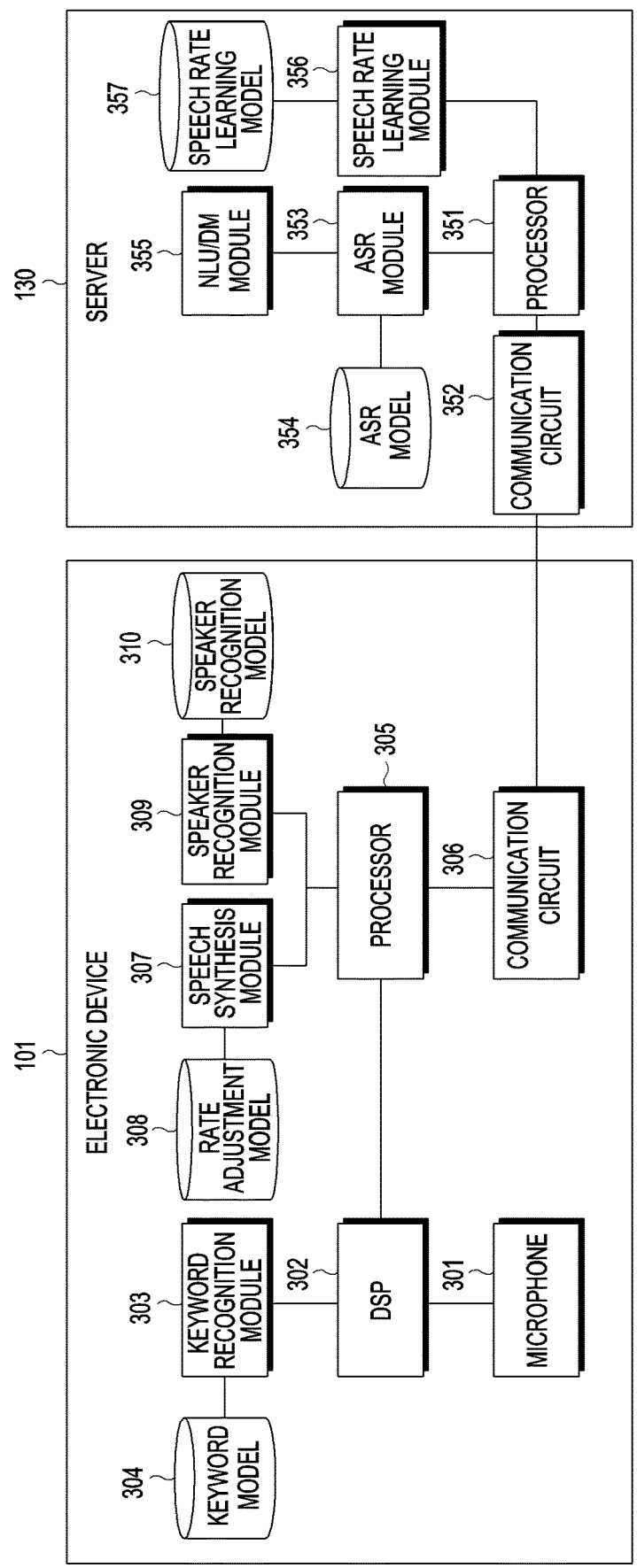
FIG. 3 is a block diagram illustrating a configuration of the electronic device and a server according to an embodiment of the disclosure.

FIG. 3 is a block diagram illustrating a configuration of the electronic device and the server according to an embodiment of the disclosure.

Referring to FIG. 3, the electronic device 101 may include a microphone 301 (for example, the microphone 215 of FIG. 2), a DSP 302, a keyword recognition module 303, a keyword model database 304, a processor 305 (for example, the processor 201 of FIG. 2), a communication circuit 306 (for example, the communication module 213 of FIG. 2), a speech synthesis module 307, a rate adjustment module database 308, a speaker recognition module 309, and a speaker recognition model database 310. The server 130 may include a processor 351, a communication circuit 352, an ASR module 353, an ASR model database 354, a speech rate learning module 356, an NLU/DM (dialogue management) module 355, and a speech rate learning model database 357.

The microphone 301 may receive a user's utterance. The Digital Signal Processor (DSP) 302 may include an audio codec (connected to a microphone or a speaker to perform simple sound preprocessing such as sound input/output, DA/AD conversion, or gain control). The processor 305 may include one or more processors and an Application Processor (AP).

The server 130 may include a recognizing server and may perform complex and more accurate speech recognition. For example, the server 130 may perform functions of large vocabulary speech recognition, speaker verification or identification, and NLU.

The keyword recognition module 303 (keyword recognition) may recognize words designated to a speech recognizer included in the DSP 302. The keyword model database 304 may include a recognition model to which the keyword recognition module 303 refers during recognition.

The speech synthesis module 307 may perform a function of modulating speech output data to be output through the speaker to a speech signal at the configured speech output rate according to the speech recognition result. According to various embodiments, the speech synthesis module 307 may adjust the speech output rate of the speech output data on the basis of the rate adjustment model information stored in the rate adjustment model database 308.

For example, according to various embodiments, the speech synthesis module 307 may generate a speech signal of which the speech output rate for all sentences of the speech output data is adjusted on the basis of information stored in the rate adjustment model database 308, generate a speech signal of which the speech output rate for at least one word included in all sentences is adjusted, or generate a speech signal of which the speech output rate for at least one syllable or phoneme included in all sentences is adjusted. The speech signal generated through the speech synthesis module 307 may be output through the speaker. At least some of the speech synthesis module 307 and/or the rate adjustment model database 308 may be included in the server 130.

According to various embodiments, the speaker recognition module 309 may perform a speaker verification or identification function. The speaker recognition module 309 may perform text independent speaker recognition (including a GMM-based method and an i-vector-based recognition method) and text dependent speaker recognition (including an HMM-based method and DTW) with reference to data stored in the speaker recognition model database 310.

The ASR module 353 may recognize a relatively large number of words or a combination thereof through large vocabulary speech recognition. The ASR model database 354 may include a recognition model that is referred to for large vocabulary speech recognition during recognition. The NLU/DM module 355 may include a model for understanding human language expression through NLU. For example, the NLU/DM module 355 may detect a user's intent to define which action will be performed for a speech command and may allow the electronic device 101 to perform the action.

The electronic device 101 according to the various embodiments may include a speaker 216, a microphone 215, a processor 201 operationally connected to the speaker 216 and the microphone 215, and the memory 202 operationally connected to the processor 201. The memory 202 may store instructions, which when executed by the processor 201, cause the electronic device 101 to receive a speech input signal through the microphone 215, obtain speech output data to be output in response to the received speech input signal, identify at least one predetermined specific condition to adjust a speech output rate (speech rate) of the speech output data, generate a speech signal of which the speech output rate of the speech output data is adjusted, based on the predetermined specific condition, and output the generated speech signal through the speaker 216.

According to various embodiments, the speech output data may be generated by performing Automatic Speech Recognition (ASR) and/or Natural Language Understanding (NLU) processing on the received speech input signal.

According to various embodiments, the speech output data may be generated by performing the ASR and/or NLU processing on the speech input signal by an external server 130.

According to various embodiments, the memory may store instructions configured to cause the electronic device 101 to determine at least one word that satisfies a predetermined condition among a plurality of words included in the speech output data and generate a speech signal of which a speech output rate for the at least one word is adjusted.

According to various embodiments, the memory may store instructions configured to cause the electronic device 101 to determine a text type of each word among the plurality of words included in the speech output data and generate a speech signal of which a speech output rate for a predetermined text type word is adjusted to be slower than another type word, according to the determination.

According to various embodiments, the predetermined text type may include at least one of a number, an address, an email, and a word or a sentence in a translated language.

According to various embodiments, the memory may store instructions configured to cause the electronic device 101 to determine at least one syllable or phoneme that satisfies a predetermined condition among a plurality of words included in the speech output data and generate a speech signal of which a speech output rate for the at least one syllable or phoneme is adjusted.

According to various embodiments, the adjustment of the speech output rate may be performed by inserting a pause interval having a predetermined length between words or syllables included in the speech output data.

According to various embodiments, the memory may store instructions configured to identify user information from the received speech input signal and generate a speech signal of which the speech output rate for the speech output data is adjusted, based on the identified user information.

According to various embodiments, the memory may store instructions configured to determine a speech rate of each word included in the received speech input signal and generate a speech signal of which the speech output rate for the speech output data is adjusted, based on the determined speech rate of each word.

Figure 4:
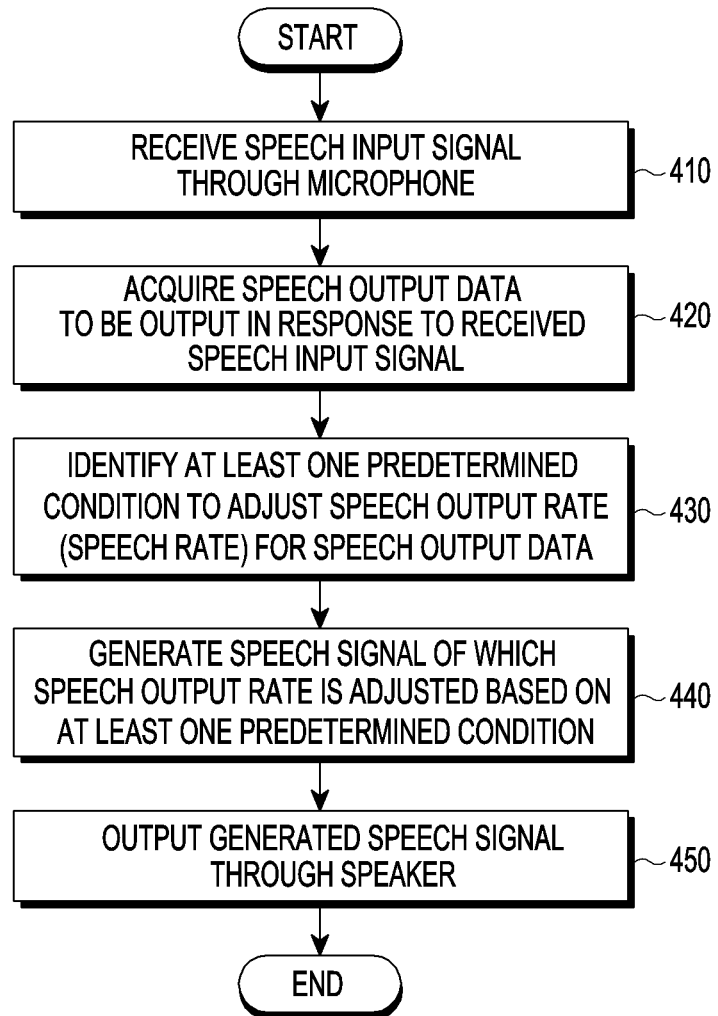
FIG. 4 is a flowchart illustrating a method of controlling speech recognition by the electronic device according to an embodiment of the disclosure.

FIG. 4 is a flowchart illustrating a method of controlling speech recognition by the electronic device according to an embodiment of the disclosure.

Referring to FIG. 4, in operation 410, the electronic device 101 may receive a speech input signal through the microphone 215.

In operation 420, the electronic device 101 may acquire speech output data to be output in response to the received speech input signal. The speech output data may be the result generated by speech-recognition processing the speech input signal. According to various embodiments, the speech recognition processing of the speech input signal may be performed by the electronic device 101 or the server 130. According to various embodiments, at least some of the speech recognition processing of the speech input signal may be performed by the electronic device 101, and at least some thereof may be performed by the server 130.

In operation 430, the electronic device 101 may identify at least one predetermined condition for adjusting the speech output rate (speech rate) of the speech output data. At least one predetermined condition for adjusting the speech output rate may be stored in the memory 202 of the electronic device 101 or stored in the server 130.

In operation 440, the electronic device 101 may generate a speech signal of which the speech output rate is adjusted on the basis of the at least one predetermined condition. According to various embodiments, the speech signal of which the speech output rate is adjusted may be generated by the electronic device 101 or the server 130.

In operation 450, the electronic device 101 may output the generated speech signal having the adjusted speech rate through the speaker 216.

Figure 5:
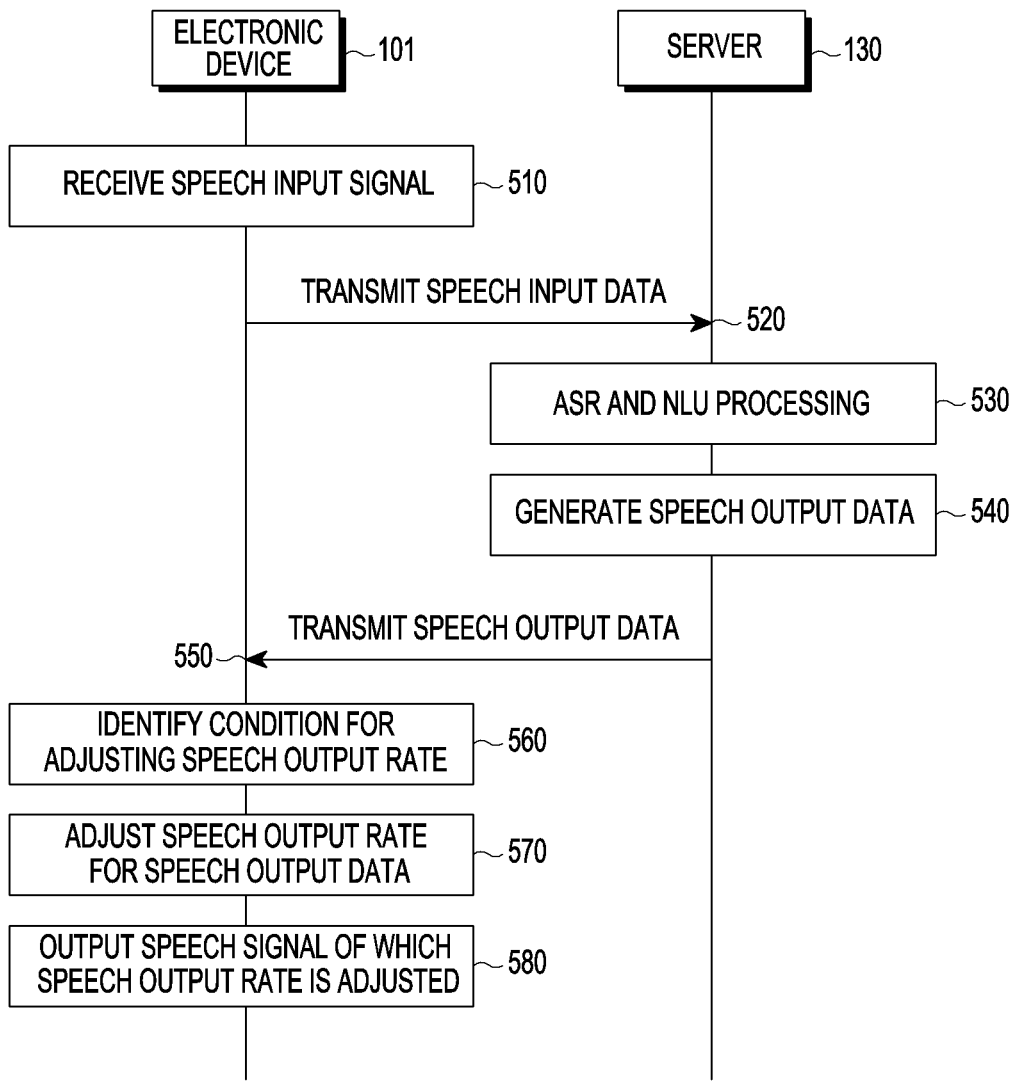
FIG. 5 is a flowchart illustrating a method of outputting a speech signal according to an embodiment of the disclosure.

FIG. 5 is a flowchart illustrating a method of outputting a speech signal according to an embodiment of the disclosure.

Referring to FIG. 5, in operation 510, the electronic device 101 may receive a speech input signal through the microphone 215.

In operation 520, the electronic device 101 may transmit speech input data corresponding to the received speech input signal or information related to the speech input data to the server 130.

In operation 530, the server 130 may process the speech input data or the information related to the speech input data received from the electronic device 101 to perform speech-recognition. According to various embodiments, the speech-recognition processing may include ASR processing and/or NLU processing. In operation 540, the server 130 may generate speech output data as at least part of the speech recognition result.

In operation 550, the server 130 may transmit the generated speech output data to the electronic device 101. In operation 560, the electronic device 101 may identify a condition for adjusting the speech output rate of the speech output data. In operation 570, the electronic device 101 may generate a speech signal of which the speech output rate of the speech output data is adjusted on the basis of the identified condition. In operation 580, the electronic device 101 may output the speech signal of which the speech output rate is adjusted through the speaker.

According to various embodiments, at least one operation of operation 530, operation 540, and operation 570 may be performed by the electronic device 101 or the server 130. For example, at least one operation of operation 530 and operation 540 may be performed by the electronic device 101 and at least one operation of operation 560 and operation 570 may be performed by the server 130.

A method according to one of the various embodiments may include, in a method of controlling speech recognition by the electronic device (for example, the processor 201), an operation of receiving a speech input signal through a microphone, an operation of obtaining speech output data to be output in response to the received speech input signal, an operation of identifying at least one predetermined specific condition to adjust a speech output rate (speech rate) for the speech output data, an operation of generating a speech signal of which the speech output rate for the speech output data is adjusted, based on the predetermined specific condition, and an operation of outputting the generated speech signal through a speaker.

According to various embodiments, the speech output data may be generated by performing Automatic Speech Recognition (ASR) and/or Natural Language Understanding (NLU) processing on the received speech input signal.

According to various embodiments, the speech output data may be generated by performing the ASR and/or NLU processing on the speech input signal by an external server.

According to various embodiments, the method may further include an operation of determining at least one word that satisfies a predetermined condition among a plurality of words included in the speech output data and an operation of generating a speech signal of which a speech output rate for the at least one word is adjusted.

According to various embodiments, the method may further include an operation of determining a text type of each word among the plurality of words included in the speech output data and an operation of generating a speech signal of which a speech output rate for a predetermined text type word is adjusted to be slower than another type word according to the determination.

According to various embodiments, the predetermined text type may include at least one of a number, an address, an email address, and a word or a sentence in a translated language.

According to various embodiments, the method may further include an operation of determining at least one syllable or phoneme that satisfies a predetermined condition among a plurality of words included in the speech output data and an operation of generating a speech signal of which a speech output rate for the at least one syllable or phoneme is adjusted.

According to various embodiments, the adjustment of the speech output rate may be performed by inserting a pause interval having a predetermined length between words or syllables included in the speech output data.

According to various embodiments, the method may further include an operation of identifying user information from the received speech input signal and an operation of generating a speech signal of which the speech output rate for the speech output data is adjusted on the basis the identified user information.

According to various embodiments, the method may further include an operation of determining a speech rate of each word included in the received speech input signal and an operation of generating a speech signal of which the speech output rate for the speech output data is adjusted on the basis of the determined speech rate of each word.

Hereinafter, examples of adjusting the speech output rate of speech output data will be described according to various embodiments with reference to FIGS. 6 to 12.

Figure 6:
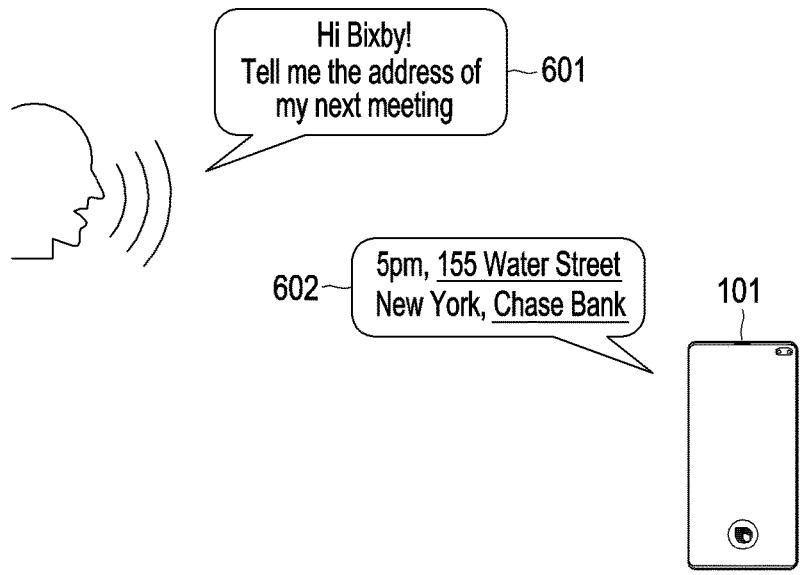
FIG. 6 illustrates a diagram of a conversation with the electronic device according to an embodiment of the disclosure.

FIG. 6 illustrates a diagram of a conversation with the electronic device according to an embodiment of the disclosure. Referring to FIG. 6, the user may speak "Hi Bixby! Tell me the address of my next meeting" 601 to the electronic device 101. In the user's utterance, "Hi Bixby" may be a preset word (for example, a wake-up word) or phrase that indicates to the electronic device 101 to perform speech recognition on the received speech signal following the wake-up word or phrase.

The electronic device 101 may recognize "Hi Bixby" in the user's utterance, operate in a speech recognition and command execution mode, and perform a relevant operation for executing a command included in the utterance. The electronic device 101 may speech-recognize "Tell me the address of my next meeting" spoken next to the preset word and output "5 pm, 155 Water Street New York, Chase Bank" 602 through the speaker as the result of analyzing the user's query 601.

According to various embodiments, speech output data to be output by the electronic device 101 as the speech recognition result may include a word that can be easily understood by the user only when the word is output more slowly. For example, "155 Water Street" and "Chase Bank" underlined in "5 pm, 155 Water Street New York, Chase Bank" to be output through the speaker of the electronic device 101 in FIG. 6 may be output relatively more slowly to help the user more easily understand the output of the electronic device 101.

Figure 7:
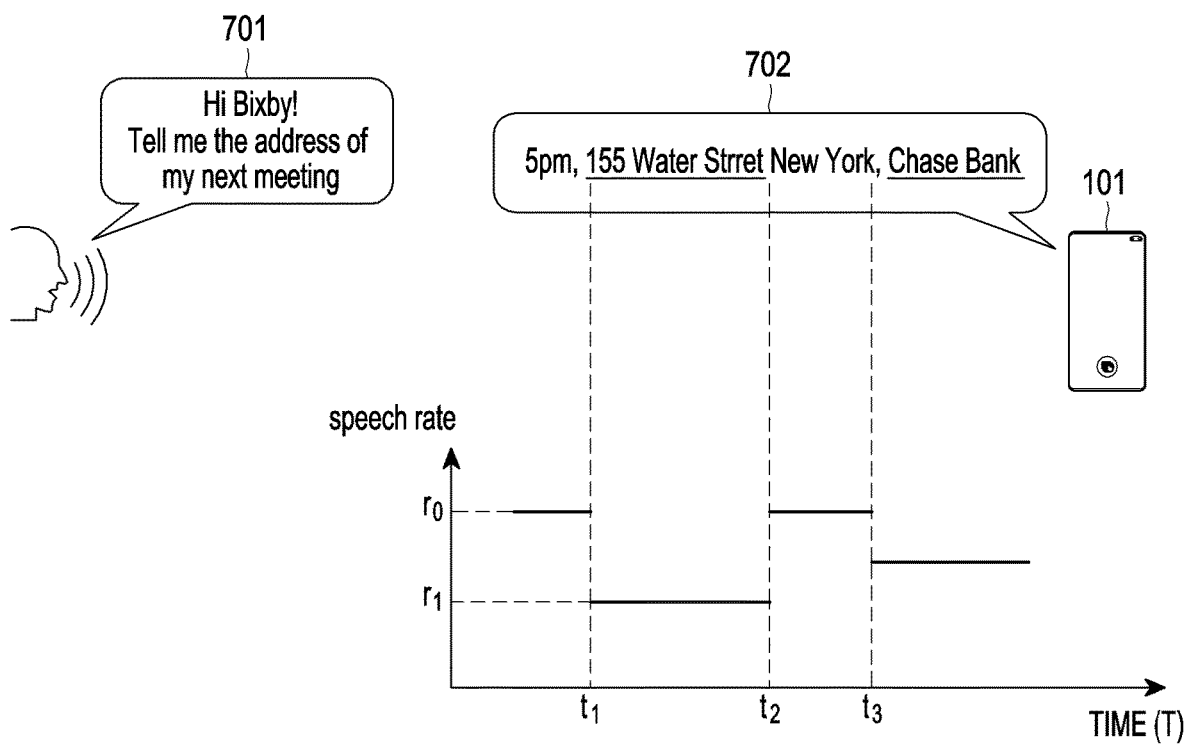
FIG. 7 illustrates the control of a speech output rate by the electronic device according to an embodiment of the disclosure.

More specifically, referring to FIG. 7, as the user speaks "Hi Bixby! Tell me the address of my next meeting" 701 to the electronic device 101, the electronic device 101 may recognize the input through speech analysis and output "5 pm, 155 Water Street New York, Chase Bank" 702 through the speaker as the result of the speech analysis and responding to the analyzed speech.

According to various embodiments, the electronic device 101 may adjust the speech output rate of at least one word in all sentences to be output through the speaker to be different from the speech output rate of the remaining words and perform output. For example, in "5 pm, 155 Water Street New York, Chase Bank" 702 to be output through the speaker, the electronic device 101 may speech-synthesize "5 pm" and "New York" at a rate of r0 which is the normal rate (general rate or standard rate), speech-synthesize "155 Water Street" at a rate of r1 which is slower than the normal rate r0, and speech-synthesize "Chase Bank" at a rate of r2 which is slower than the normal rate r0 and faster than r1. As a result, through the speaker, the electronic device 101 may more slowly output "155 Water Street" during an interval from t1 to t2 at the rate r1 and output "New York" during an interval from t2 to t3 at the normal rate r0.

As described above, the user may more easily understand the sentence output through the speaker of the electronic device 101 by varying a speech output rate of particular words in one sentence.

According to various embodiments, when the user makes an utterance to inquire about a phone number stored in the electronic device 101, the electronic device 101 may synthesize speech signals by identifying a predefined condition and adjusting a speech output rate. For example, while a sentence and a name are output at 100% of the speech output rate, a phone number is output at a reduced speech rate (for example, 75% of the speech output rate), and additional pause intervals may be added between pairs of numbers.

According to various embodiments, the electronic device 101 may adjust the speech output rate based on user configurations and a recognized user class (for example, age or accessibility). For example, the electronic device 101 may measure the speech output rate of speech commands spoken by the user. The electronic device 101 estimates the user's age, detects abnormality from the user's speech, and detects accessibility. All social data may be used by the server 130 and thus may determine an optimal speech output rate for the user on the basis of statistics of speech output rates learned during speech recognition. The method may provide an adaptive scheme for learning the optimal speech output rate from speech data input through the microphone of the electronic device 101.

According to various embodiments, the electronic device 101 may evaluate a user's understanding level in real time and adjust the speech output rate on the basis thereof. For example, when the user makes a request for repeating information to the electronic device 101 or asks for spelling, the electronic device 101 may adjust the speech output rate (for example, to be slower).

Figure 8:
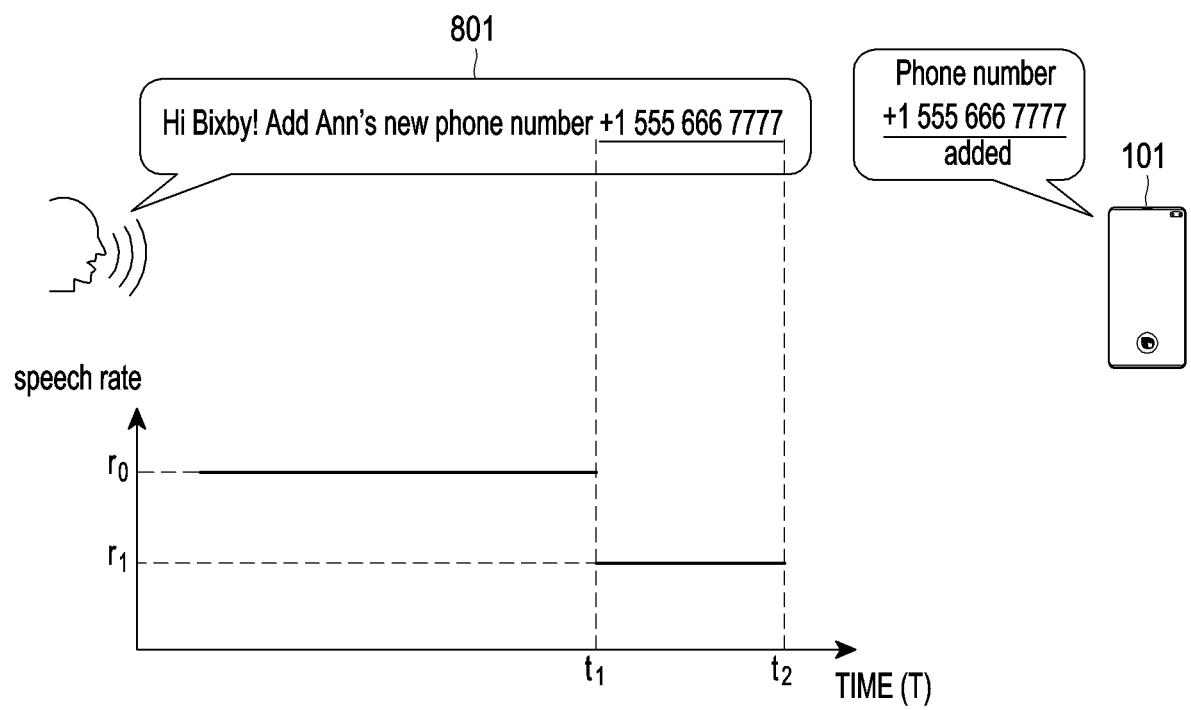
FIG. 8 illustrates the control of a speech output rate by the electronic device according to an embodiment of the disclosure.

FIG. 8 illustrates the control of the speech output rate by the electronic device according to an embodiment of the disclosure. Referring to FIG. 8, the user speaks "Hi Bixby! Add Ann's new phone number +1 555 666 7777" 801 to the electronic device 101. In the user's utterance, "Hi Bixby" may be a preset word (for example, a wake-up word) or phrase that indicates to the electronic device 101 to perform speech recognition on the received speech signal that follows the wake-up word.

The electronic device 101 may recognize "Hi Bixby" in the user's utterance, operate in a speech recognition and command execution mode, and perform a relevant operation for executing a command included in the utterance. The electronic device 101 may speech-recognize "Add Ann's new phone number +1 555 666 7777" spoken after the wake-up word, store a new phone number "+1 555 666 7777" in a phone book as the result thereof, and then output "Phone number +1 555 666 7777 added" through the speaker to inform the user that the command has been normally executed.

According to various embodiments, when the user registers the phone number as described above, the user may speak the phone number more slowly than the normal rate to allow the electronic device 101 to accurately recognize numbers. For example, when speaking "Hi Bixby! Add Ann's new phone number +1 555 666 7777" 801, the user may speak "Hi Bixby! Add Ann's new phone number" at the normal rate r0 and speak "+1 555 666 7777" at the speed r1 that is slower than the normal speed. The electronic device 101 or the server 130 may determine the word that is spoken particularly slowly in the user's utterance or a type of the word, and adjust the speech output rate on the basis thereof in future speech output.

According to various embodiments, in the embodiment of FIG. 8, when the electronic device 101 speech-recognizes the user's utterance, stores a new phone number in the phone book, and then outputs "Phone number +1 555 666 7777 added" through the speaker, the electronic device 101 may adjust the speech output rate such that "+1 555 666 7777" is output more slowly than the normal rate. For example, according to various embodiments, the electronic device 101 may analyze the speech output speed of each word in the user's utterance and adjust the speech output rate in future speech output to mimic the speech input. As described above, by making the electronic device 101 apply the slower speech output rate when a speech corresponding to a phone number is output, a recognition error when the phone number is registered may be avoided.

Figure 9:
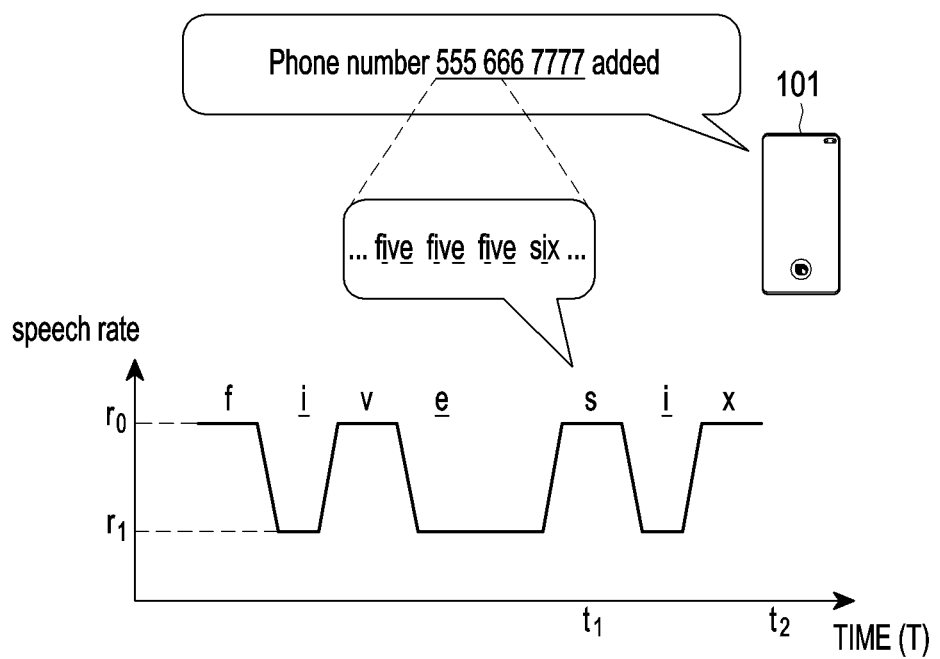
FIG. 9 illustrates the control of the speech output rate by the electronic device according to an embodiment of the disclosure.

FIG. 9 illustrates the control of the speech output rate by the electronic device according to an embodiment of the disclosure. Referring to FIG. 9, the electronic device 101 or the server 130 may learn the speech output rate of each biphone (or diphone).

In each language, the speech output rate of vowels may be changed much more than consonants. For example, as illustrated in FIG. 9, in "five" and "six," the speech output rate may be changed much more in "i," "e," and "i" than in "f," "v," "s," and "x." Further, a length of a pause interval between each consonant and each vowel may be changed.

According to various embodiments, the electronic device 101 may effectively adjust the speech output rate of the consonant or the vowel in speech output data in speech output by learning the speech output rate of each biphone (or diphone).

Figure 10:
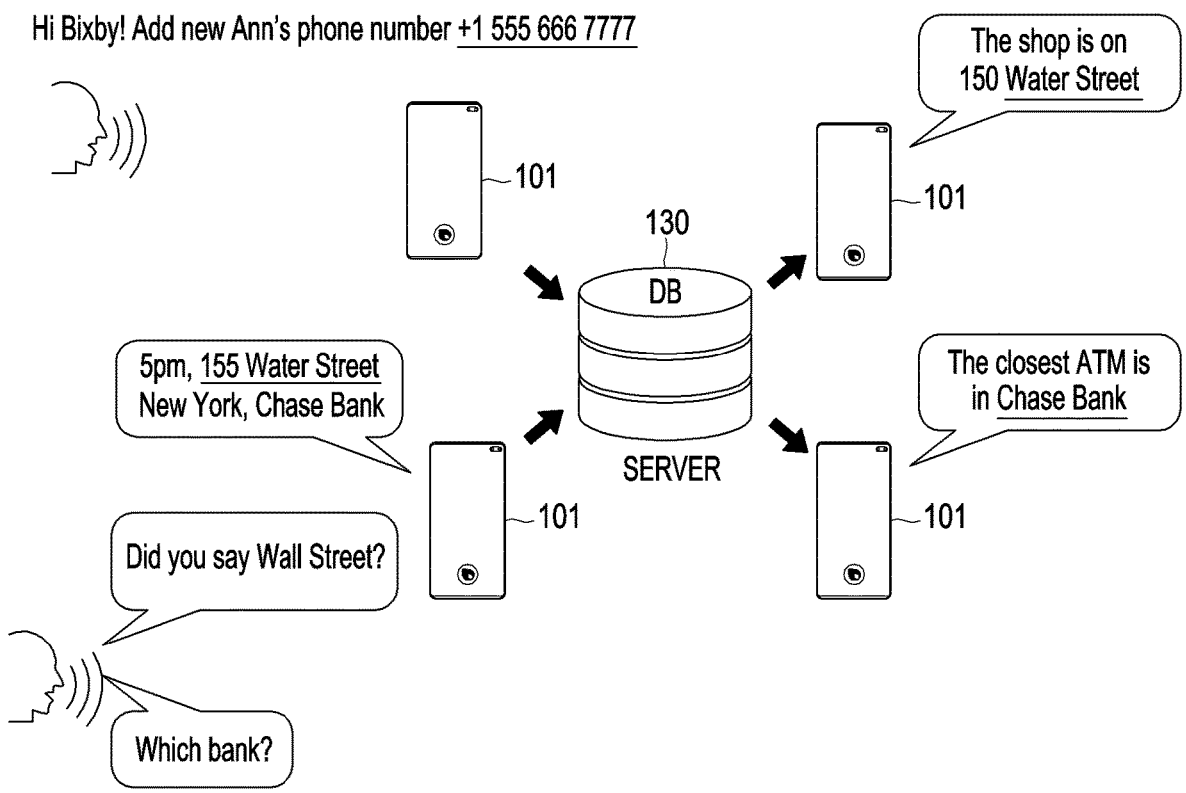
FIG. 10 illustrates a learning module in the server according to an embodiment of the disclosure.

FIG. 10 illustrates a learning module in the server according to an embodiment of the disclosure. Referring to FIG. 10, the electronic device 101 may receive various user utterances, store the same in the server 130, and learn the same.

For example, the electronic device 101 may store a rate of the speech "Hi Bixby! Add Ann's new phone number +1 555 666 7777" spoken by the user in the server 130 and analyze and learn the rate of each word.

Further, when the electronic device 101 outputs "5 pm, 155 Water Street New York, Chase Bank" through the speaker, if the user speaks "Did you say Wall Street?" to ask again, the electronic device 101 or the server 130 may analyze the sentence which the user speaks and the server 130 may learn the sentence. Accordingly, when outputting "The shop is on 150 Water Street" through the speaker, the electronic device 101 may identify the information previously learned through the server 130 and adjust the speech output rate. For example, the electronic device 101 identifies the learned information and determines that the user recognition for "Water Street" was low and thus the user asked again, so the electronic device 101 may adjust the speech output rate of "Water Street" in all sentences to be output to be slower than the average rate and perform output.

Further, when the electronic device 101 outputs "5 pm, 155 Water Street New York, Chase Bank" through the speaker, if the user speaks "Which bank?" to ask again, the electronic device 101 or the server 130 may analyze the sentence of the user and the server 130 may learn the sentence. Accordingly, when outputting "The closest ATM is in Chase Bank" through the speaker, the electronic device 101 may identify the information previously learned through the server 130 and adjust the speech output rate. For example, the electronic device 101 identifies the learned information and determines that the user recognition for "Chase Bank" was low and thus the user asked again, so the electronic device 101 may adjust the speech output rate of "Chase Bank" in all sentences to be output to be slower than the average rate and perform corresponding output.

Figure 11:
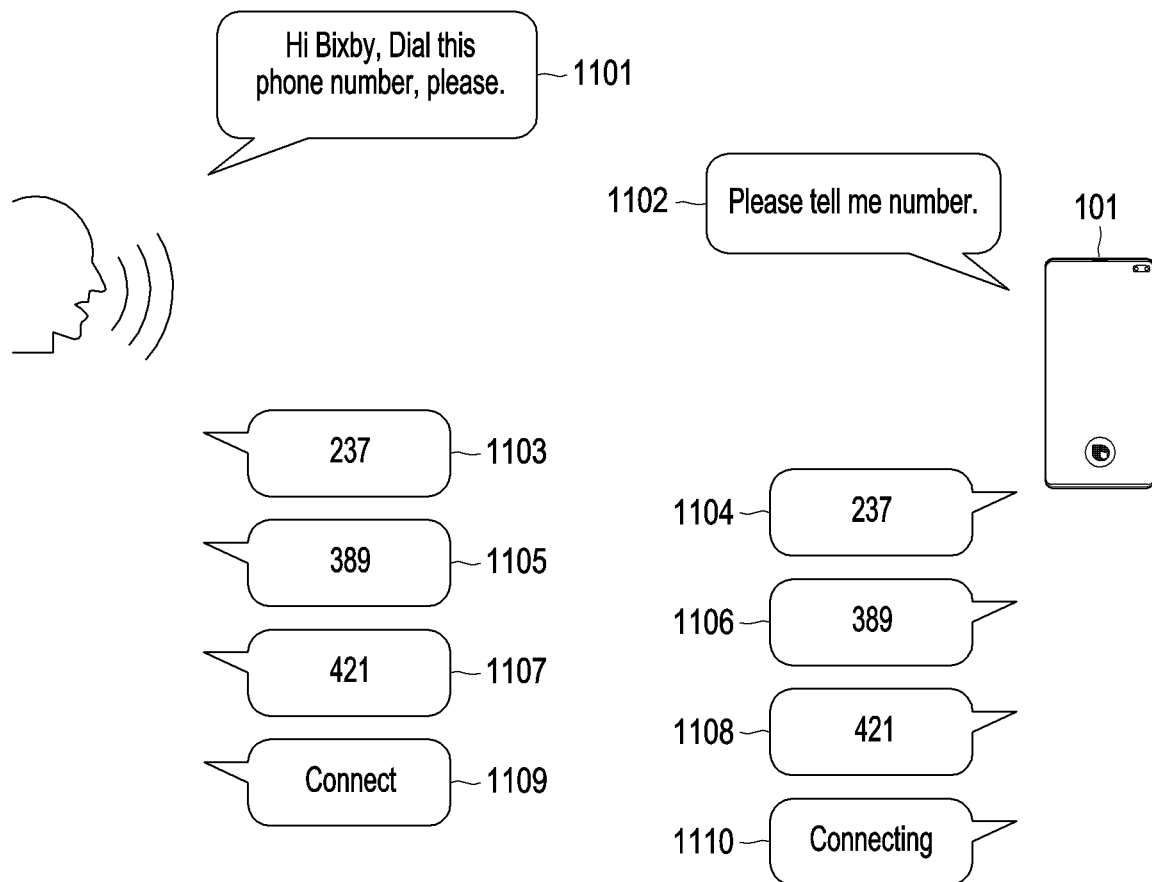
FIG. 11 illustrates a diagram of a conversation with the electronic device according to an embodiment of the disclosure.

FIG. 11 illustrates a diagram of conversation with the electronic device according to an embodiment of the disclosure. Referring to FIG. 11, the user may speak "Hi Bixby, dial this phone number, please" 1101 to the electronic device 101 and make a request for opening a phone number input mode.

The electronic device 101 may start the phone number input mode by speech-recognizing the utterance and output "Please tell me number" 1102 to make a request for speaking the phone number to the user.

According to various embodiments, the user may speak only some numbers of the whole phone number. The electronic device 101 may recognize that the user's utterance corresponds to a phone number and the electronic device 101 may repeat back the numbers through the speaker to demonstrate an accurate recognition of the user's utterance.

For example, when the user speaks "237" 1103, the electronic device 101 may recognize the speech and output the same "237" 1104 through the speaker as a confirmation to the user. In the same way, when the user speaks "389" 1105, the electronic device 101 may recognize the speech and output the same "389" 1106 through the speaker. In the same way, when the user speaks "421" 1107, the electronic device 101 may recognize the speech and output the same "421" 1108 through the speaker. Last, when the user speaks "Connect" 1109, the electronic device 101 may output "Connecting" 1110 through the speaker and attempt to make a phone call to the corresponding recognized phone number. Thereby, accuracy of the user's speech may be confirmed. If the electronic device 101 does not accurately recognize the user's speech, the user may thereby request a correction or repeat the input.

Figure 12:
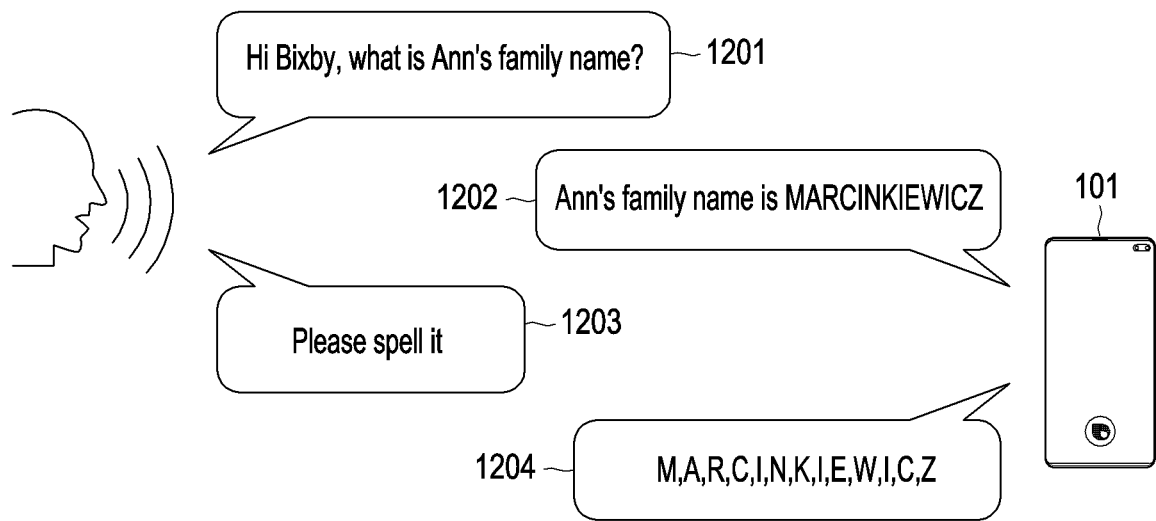
FIG. 12 illustrates a diagram of a conversation with the electronic device according to an embodiment of the disclosure.

FIG. 12 illustrates a diagram of a conversation with the electronic device according to an embodiment of the disclosure. FIG. 12 shows an example in which the electronic device 101 supports spelling according to various embodiments.

Referring to FIG. 12, the user speaks "Hi Bixby, what is Ann's family name?" 1201 and thus make a request for outputting a word to the electronic device 101.

After speech-recognizing the user's utterance, the electronic device 101 may output "Ann's family name is MARCINKIEWICZ" 1202 through the speaker. The word output from the electronic device 101 may be a word that is difficult for the user to pronounce and understand, so that the user may speak "Please spell it" 1203 to request spelling of the corresponding word.

The electronic device 101 may identify data on level of word understanding ratios learned by speech rate models from the server 130. The electronic device 101 may use the speech rate to identify which word is hard to understand and is spelled. According to the identification, the electronic device 101 may output individual letters of "M,A,R,C,I,N, K,I,E,W,I,C,Z" 1204 through the speaker.

According to various embodiments, the electronic device 101 may adjust the speech output rate of the spelling. According to various embodiments, when the user asks the electronic device 101 to "say it more slowly," the electronic device 101 may recognize the user request as an indication that the corresponding sentence is hard for the user to understand. The electronic device 101 may learn from the recognized result, reduce the speech output rate of the corresponding sentence or word to be output, and repeatedly output the sentence at a slower speech output rate.

According to various embodiments, the electronic device 101 may adjust the speech rate of the speech output data to be output through the speaker or add a pause interval in consideration of the evaluated perception ability of the user. For example, the user's perception ability may include information type (for example, texts, addresses, names, and names and words in other languages), text complexity, complexity and difficulty of specific kinds of information to the user (for example, science text), new information to the user, complex medical information, content in a leaflet, and so on.

According to various embodiments, the electronic device 101 may adjust the speech rate of speech output data to be output through the speaker or add a pause interval in consideration of user's psychophysical abilities. For example, the user's psychophysical abilities may indicate how fast the user receives and understands information. The electronic device 101 may recognize that user age or general abilities for understanding may require slower delivery of information. The general abilities for understanding may be considered on the basis of how fast or how slowly the user generally or temporarily speaks.

According to various embodiments, a user's temporary abilities may be described below. For example, it may be determined what the user is doing on the basis of a user's activity, and for example, the user who is exercising (running or exercising in a gym) may have a limited ability for understanding a speech. The user's activity may be measured from a heart rate (or intensity information).

According to various embodiments, the speech rate of the speech output data to be output through the speaker may be adjusted or the pause interval may be added in consideration of information on a location at which the user exists. For example, when the user is driving a vehicle, which corresponds to the general type of the activity, or just after the user wakes up in the early morning the speech rate of the speech output data to be output through the speaker may be adjusted or the pause interval may be added. For example, if the electronic device determines based on an evaluation that the user has just woken up and is thus sleepy, the output rate may be adjusted to be slightly slower.

According to various embodiments, the speech rate of the speech output data to be output through the speaker may be adjusted or the pause interval may be added in consideration of external conditions of the user. For example, the speech output rate may be adjusted to be slow on the basis of user distance from a loudspeaker determined by an environment noise level (and additionally turn up the volume level of the speaker in response) or any other time when a user may have difficulty to listen to speech.

According to various embodiments, the server 130 may store learned information to be used for the speech output rate in the database. For example, fixed rules to which some types of text are allocated may be configured in the server 130. For example, some rules may be allocated to the server 130 according to each text or a text type (for example, a number, a name, an address, or a name translated in another language).

According to various embodiments, the server 130 may adjust the speech rate of the speech output data to be output through the speaker or add the pause interval in consideration of evaluation information collected from the user. For example, when the user asks about some information again, data about how the user provides some text and which types of words or phrases are requested to be repeated by the user may be stored in the database through the server 130.

According to various embodiments, the information stored in the database may be shared with other users and may include various pieces of additional information. For example, the database may store information on age, gender, and nationality of the user, and where the user resides and the information may be considered to adjust the output rate of the speech output data.

Hereinafter, embodiments in which the electronic device 101 speech-synthesizes speech output data to be output through the speaker at various speech output rates will be described with reference to FIGS. 13 to 15. The following embodiments are only examples for implementing the disclosure but the disclosure is not limited thereto and various speech synthesis methods may be applied. For example, speech synthesis may be processed on the basis of the biphone concept, and the biphone may be combined using Pitch Synchronous Overlap and Add (PSOLA). The biphone indicates a recorded sample of human speech modulations generated when sounds in the speech is changed from text to text. The PSOLA may expand or reduce at least one of or both the length and the pitch of recorded sounds while not causing noticeable distortion. Accordingly, it is possible to make the speech twice as slow or speed up the speech.

Figure 13:
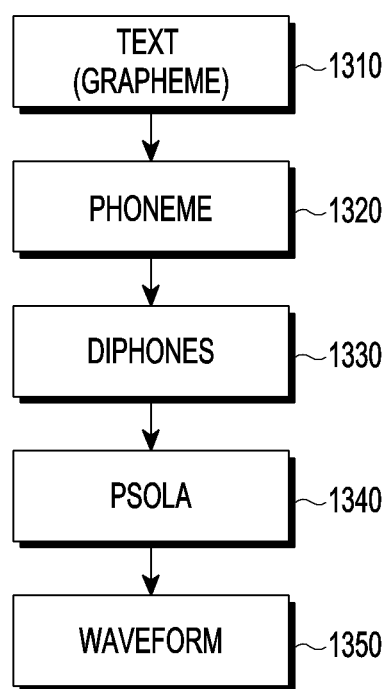
FIG. 13 illustrates a method of speech synthesis according to an embodiment of the disclosure.

FIG. 13 illustrates a method of speech synthesis procedure according to an embodiment of the disclosure. Referring to FIG. 13, when speech output data to be output through the speaker is "phonetic" text 1310, the data may be separated into phonemes 1320. The separated phonemes may be analyzed in the form of biphones (or diphones) 1330, and a speech synthesis procedure 1340 may be performed according to a PSOLA method illustrated in FIGS. 14A to 14D and a speech waveform 1350 may be generated. According to various embodiments, a speech synthesis algorithm may be used to change rates of spoken words. The speech rate of the synthesized speech may vary depending on vowels and consonants and may be used as a method of acquiring an optimal rate when a deep neural network performs recording. Further, the ASR may mark phonemes in speeches recorded for lecturers requested to speak faster or more slowly.

According to various embodiments, the rate of actual speech data spoken by the user may be used to generate a speech output rate profile for each type of the utterance. According to various embodiments, pause intervals between words may be applied to provide a longer time to the user to understand the meaning. Further, pause intervals between sentences may be changed to be longer or shorter than the pause intervals between the words.

Figure 14A:
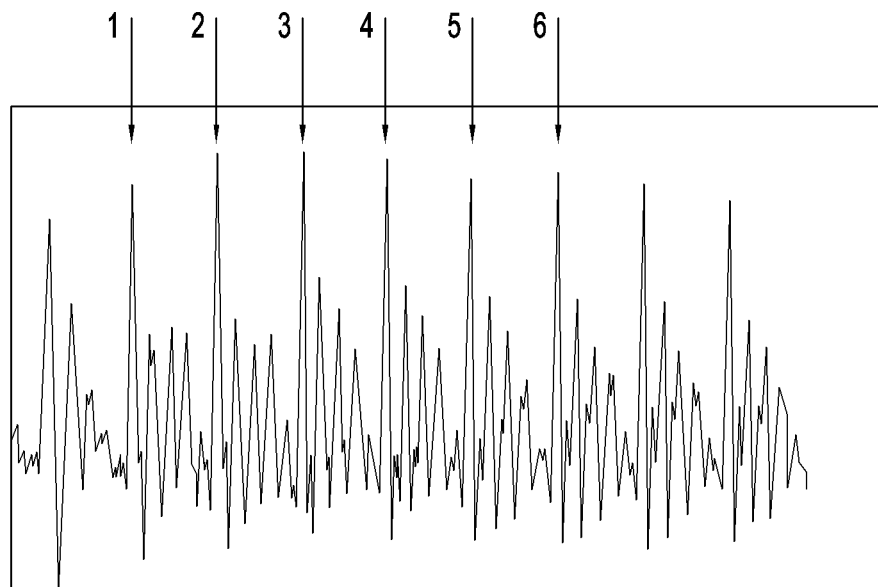
FIG. 14A illustrates a speech signal in the speech synthesis procedure, according to an embodiment of the disclosure.
Figure 14B:
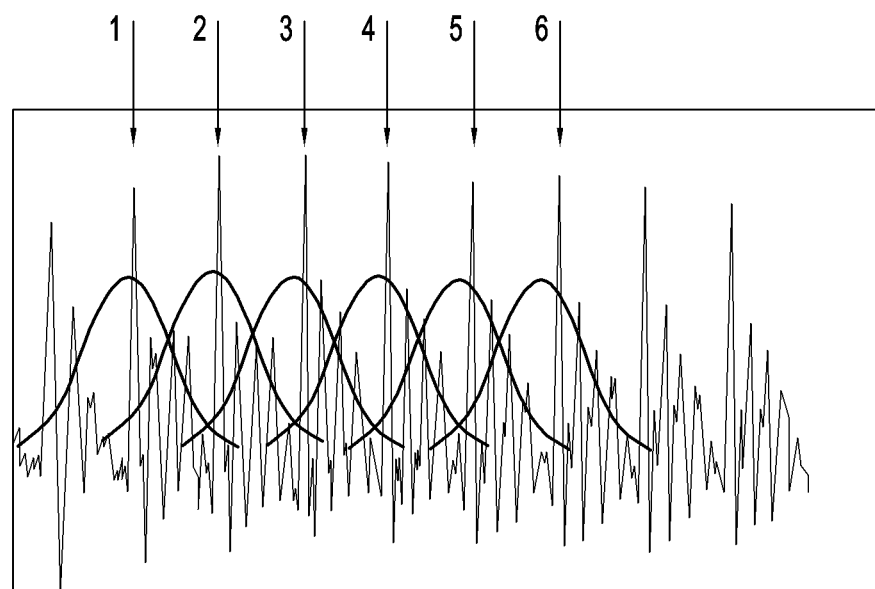
FIG. 14B illustrates a speech signal in the speech synthesis procedure, according to an embodiment of the disclosure.
Figure 14C:
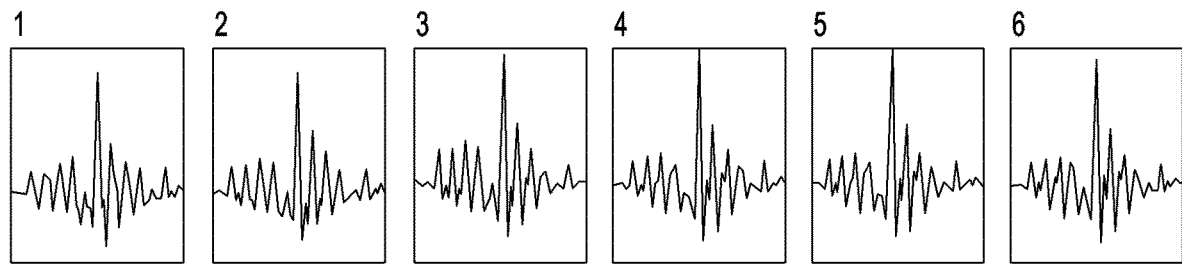
FIG. 14C illustrates a speech signal in the speech synthesis procedure, according to an embodiment of the disclosure.
Figure 14D:
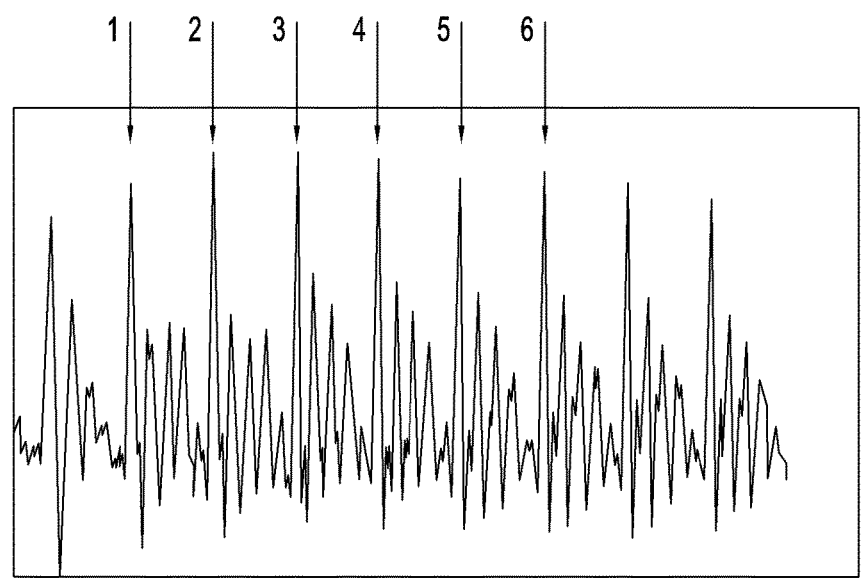
FIG. 14D illustrates a speech signal in the speech synthesis procedure, according to an embodiment of the disclosure.

FIG. 14A illustrates a graph of a speech signal indicating a speech synthesis procedure according to the PSOLA method, FIG. 14B illustrates a graph of a speech signal indicating a speech synthesis procedure according to the PSOLA method, FIG. 14C illustrates a graph of a speech signal indicating a speech synthesis procedure according to the PSOLA method, and FIG. 14D illustrates a graph of a speech signal indicating a speech synthesis procedure according to the PSOLA method. FIG. 14A shows epoch locations (maximum values of amplitude of a pitch waveform) in all speech signals. FIG. 14B is a graph showing hamming windows used to separate processing frames. All waveform frames may be separated into a plurality of samples (for example, 6 samples) according to the hamming windows of FIG. 14B as illustrated in FIG. 14C. A new speech may be re-synthesized as illustrated in FIG. 14D by overlapping and combining the separated frames.

Figure 15A:
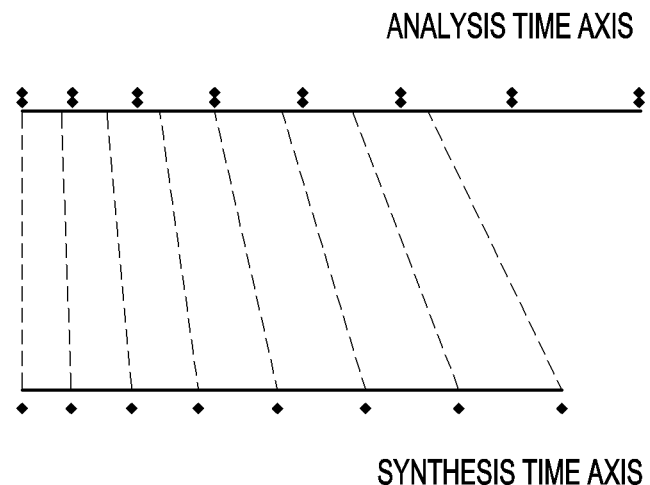
FIG. 15A illustrates adjusting the output rate of speech signals in the speech synthesis procedure, according to an embodiment of the disclosure.
Figure 15B:
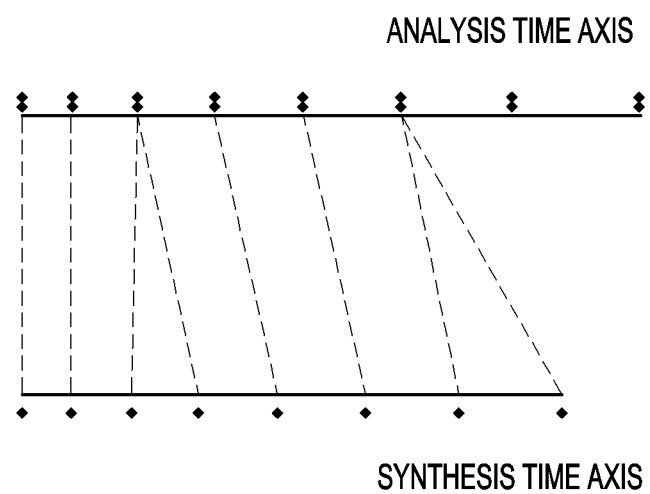
FIG. 15B illustrates adjusting the output rate of speech signals in the speech synthesis procedure, according to an embodiment of the disclosure.

FIG. 15A illustrates adjusting the output rate of speech signals in the speech synthesis procedure and FIG. 15B illustrates adjusting the output rate of speech signals in the speech synthesis procedure. Referring to FIG. 15A, a speech output length increases on a synthesis time axis compared to an analysis time axis according to speech synthesis of modulating the speech output rate and thus the speech output rate may decrease. Referring to FIG. 15B, a speech output time increases on a synthesis time axis compared to an analysis time axis as the pause interval is added to the synthesis time axis according to speech synthesis of modulating the speech output rate and thus the speech output rate may decrease.

For example, through the examples illustrated in FIGS. 15A and 15B, the speech output rate becomes slower according to speech synthesis processing. Marks on the upper part and the lower part in FIGS. 15A and 15B indicate analysis pitch marks and synthesis pitch marks, respectively. Dotted lines in FIG. 15A indicate a time-scale warping function on the analysis time axis and the synthesis time axis corresponding to desired time-scale modulation. In FIG. 15B, the dotted lines indicate resultant pitch-mark mapping in the case in which two analysis ST-signals of six analysis ST-signals are copied.

Figure 16:
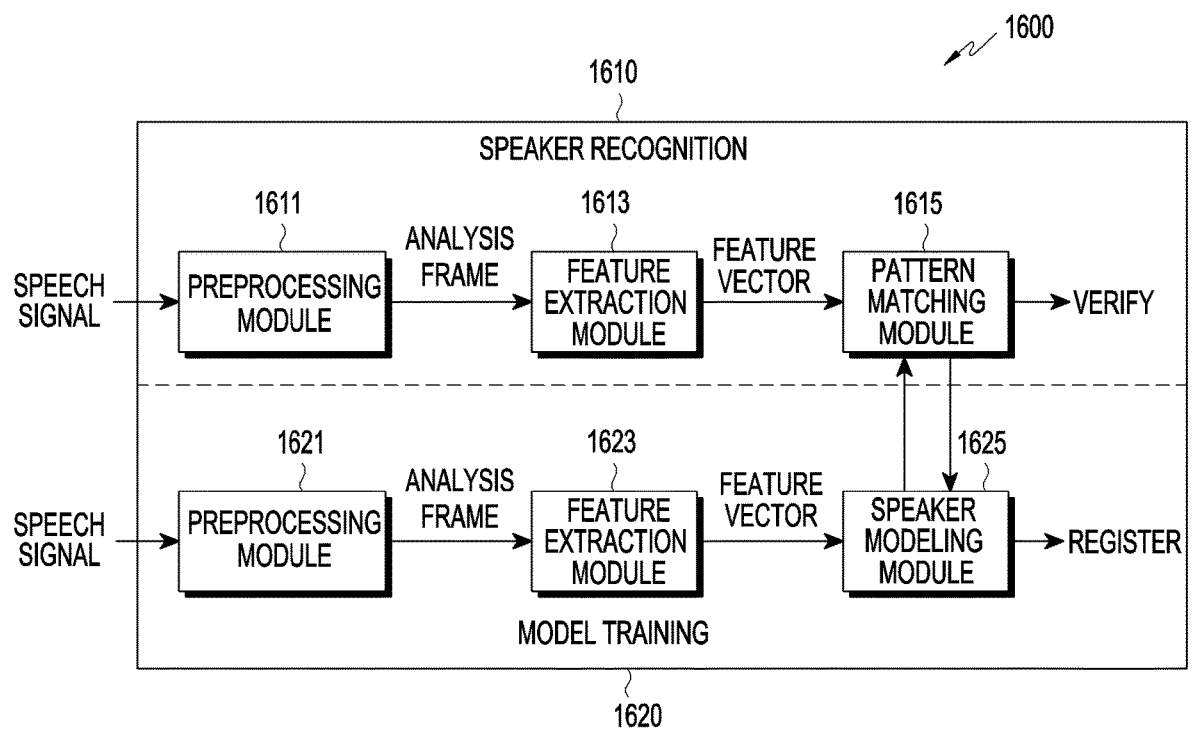
FIG. 16 illustrates a speaker recognition system according to an embodiment of the disclosure.

FIG. 16 illustrates a speaker recognition system according to an embodiment of the disclosure. Referring to FIG. 16, according to various embodiments, a speaker recognition system 1600 may include a speaker recognition processing module 1610 and a model training processing module 1620. The speaker recognition processing module 1610 may use a preprocessing module 1611, a feature extraction module 1613, or a pattern-matching module 1615. The model-training processing module 1620 may use a preprocessing module 1621, a feature extraction module 1623, or a speaker-modeling module 1625.

According to various embodiments, the speaker recognition module 1610 may preprocess the input voice signal through the preprocessing module 1611 and output an analysis frame. The feature extraction module 1613 may extract features from the analysis frame output through the preprocessing module 1611 and output a feature vector. The pattern-matching module 1615 may verify the feature vector by comparing the feature vector with the result of the speaker-modeling module 1625, and the verification result may be scored and output.

According to various embodiments, the model-training processing module 1620 may preprocess the input voice signal through the preprocessing module 1621 and output an analysis frame. The feature extraction module 1623 may extract features from the analysis frame output through the preprocessing module 1621 and output a feature vector. The speaker-modeling module 1625 may model and register a speaker by the feature vector.

According to various embodiments, the electronic device 101 may perform user identification, user registration, or user authentication through the speaker recognition. According to various embodiments, the electronic device 101 may adaptively adjust the speech output rate on the basis of user authentication information authenticated through the speaker recognition.

Hereinafter, an integrated intelligent system to which various embodiments in which the electronic device 101 and the server 130 perform speech recognition may be applied will be described with reference to FIGS. 17 to 19.

Figure 17:
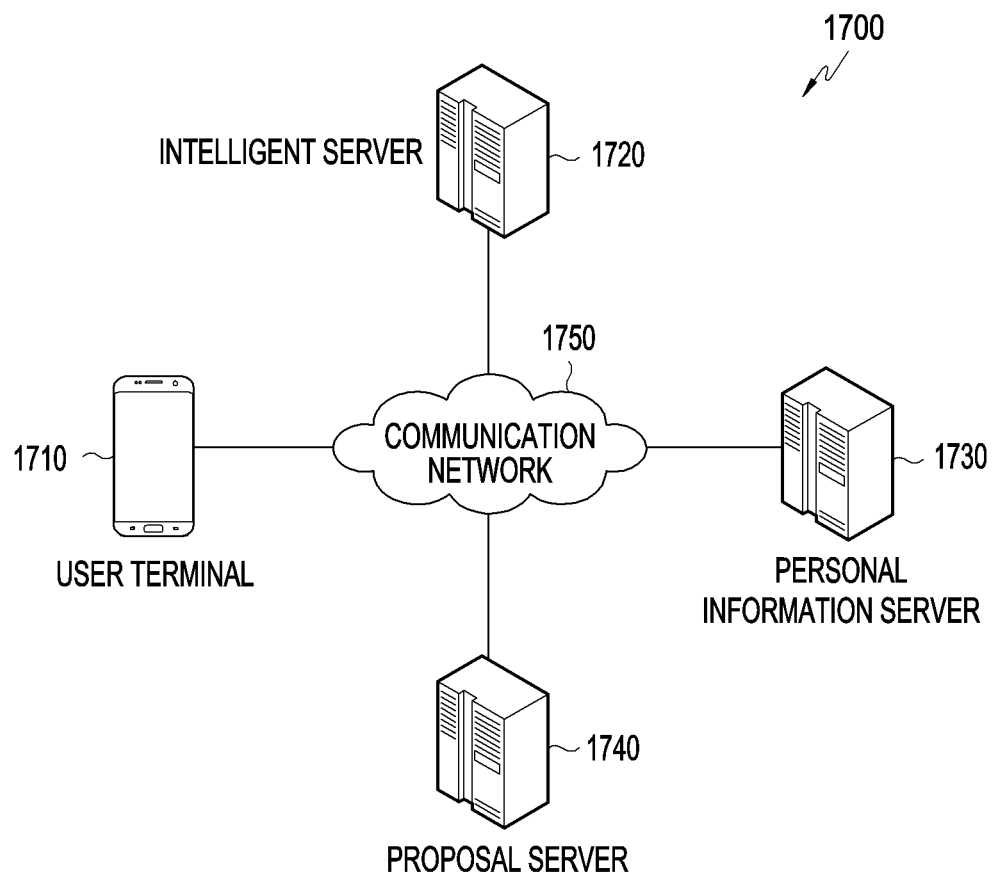
FIG. 17 illustrates an integrated intelligent system according to an embodiment of the disclosure.

FIG. 17 illustrates an integrated intelligence system according to an embodiment of the disclosure. Referring to FIG. 17, an integrated intelligence system 1700 may include a user terminal 1710, an intelligent server 1720, a personal information server 1730, or a proposal server 1740.

The user terminal 1710 may provide required services to the user through an app (or an application) (for example, an alarm app, a message app, or a photo (gallery) app) stored within the user terminal 1710. For example, the user terminal 1710 may execute and operate another app through an intelligent app (or a music recognition app) stored within the user terminal 1710. Through the intelligent app of the user terminal 1710, user input for executing the other app and performing an operation may be received. The user input may be received through, for example, a physical button, a touch pad, a voice input, or a remote input. According to an embodiment, the user terminal 1710 may correspond to various types of terminal devices (or electronic devices) capable of connecting to the Internet, such as a mobile phone, a smart phone, a Personal Digital Assistant (PDA), or a notebook computer.

According to an embodiment, the user terminal 1710 may receive a user's utterance as the user input. The user terminal 1710 may receive the user's utterance and generate a command for executing an app on the basis of the user's utterance. Accordingly, the user terminal 1710 may operate the app through the command.

The intelligent server 1720 may receive a user's voice input from the user terminal 1710 through a communication network and convert the voice input into text data. In another example, the intelligent server 1720 may generate (or select) a path rule on the basis of the text data. The path rule may include information on an action (or an operation) for performing a function of the app or information on a parameter required for performing the operation. Further, the path rule may include the sequence of operation of the app. The user terminal 1710 may receive the path rule, select an app according to the path rule, and perform an operation included in the path rule in the selected app.

The term "path rule" may generally mean the sequence of states in which the electronic device performs tasks requested by the user, but is not limited thereto. In other words, the path rule may include information on the sequence of the states. The tasks may be, for example, actions that can be provided by the intelligent app. The tasks may include generation of a schedule, transmission of photos to a desired counterpart, or provision of weather information. The user terminal 1710 may sequentially exist in one or more states (for example, operation states of the user terminal 1710) and perform the tasks.

According to an embodiment, the path rule may be provided or generated by an Artificial Intelligence (AI) system. The AI system may be a rule-based system, a neural-network-based system (for example, a Feedforward Neural Network (FNN)), or a Recurrent Neural Network (RNN). Alternatively, the AI system may be a combination thereof or another AI system. According to an embodiment, the path rule may be selected from a set of predefined path rules, or may be generated in real time in response to a user request. For example, the AI system may select at least a path rule from among a plurality of predefined path rules or may generate a path rule dynamically (or in real time). Further, the user terminal 1710 may use a hybrid system for providing a path rule.

According to an embodiment, the user terminal 1710 may perform the operation and display a screen corresponding to the state of the user terminal 1710 having performed the operation on the display. According to another embodiment, the user terminal 1710 may perform the operation and may not display the operation result on the display. The user terminal 1710 may perform, for example, a plurality of operations and display the result of only some of the plurality of operations on the display. For example, the user terminal 1710 may display only the result of the last operation on the display. According to another embodiment, the user terminal 1710 may receive user input and display the result of the operation on the display.

The personal information server 1730 may include a database storing user information. For example, the personal information server 1730 may receive user information (for example, context information and app execution) from the user terminal 1710 and store the user information in the database. The intelligent server 1720 may receive the user information from the personal information server 1730 through a communication network 1750 and use the same for generating a path rule for the user input. According to an embodiment, the user terminal 1710 may receive the user information from the personal information server 1730 through a communication network and use the same as information for managing the database.

The proposal server 1740 may include a database storing introduction of a function or an application within the terminal or information on a function to be provided. For example, the proposal server 1740 may include a database for a function by which the user receives user information of the user terminal 1710 from the personal information server 1730. The user terminal 1710 may receive information on the function to be provided from the proposal server 1740 through the communication network and provide the information to the user.

Figure 18:
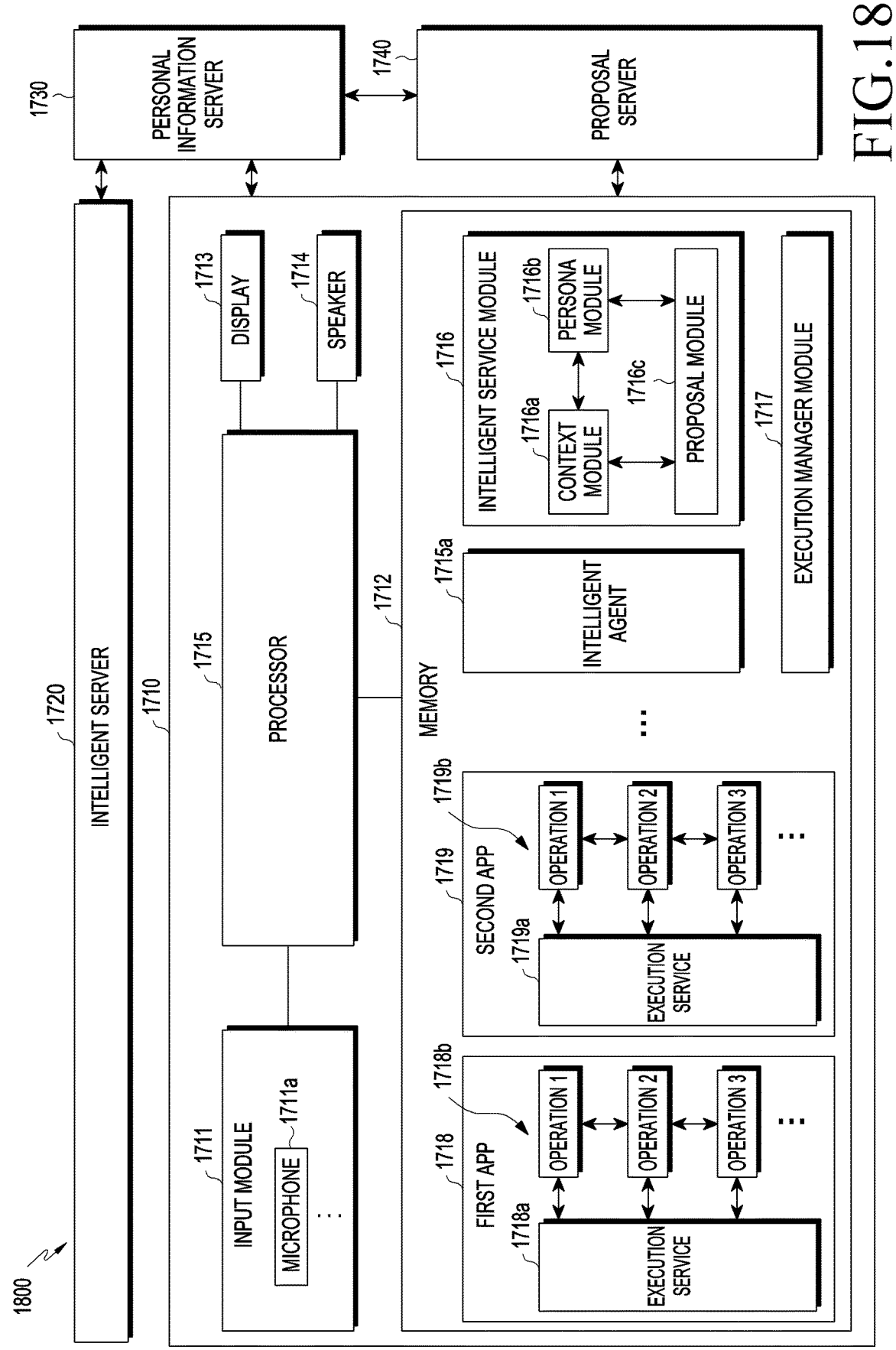
FIG. 18 is a block diagram illustrating a user terminal of the integrated intelligent system according to an embodiment of the disclosure.

FIG. 18 is a block diagram 1800 illustrating a user terminal of an integrated intelligent system according to an embodiment of the disclosure.

Referring to FIG. 18, the user terminal 1710 may include an input module 1711, a display 1713, a speaker 1714, a memory 1712, and a processor 1715. The user terminal 1710 may further include a housing and the elements of the user terminal 1710 may be located within the housing or disposed on the housing.

The input module 1711 according to an embodiment may receive user input from the user. For example, the input module 1711 may receive user input from a connected external device (for example, a keyboard or a headset). In another example, the input module 1711 may include a touch screen (for example, a touch screen display) coupled to the display 1713. In another example, the input module 1711 may include a hardware key (or a physical key) located in the user terminal 1710 (or the housing of the user terminal 1710).

According to an embodiment, the input module 1711 may include a microphone 1711a for receiving a user's utterance as a voice signal. For example, the input module 1711 may include a speech input system and receive a user's utterance as a speech signal through the speech input system.

The display 1713 according to an embodiment may display an image, a video, and/or an execution screen of an application. For example, the display 1713 may display a Graphic User Interface (GUI) of an app.

According to an embodiment, the speaker 1714 may output a voice signal. For example, the speaker 1714 may output a voice signal generated by the user terminal 1710 to be audible to the user.

According to an embodiment, the memory 1712 may store a plurality of apps (or applications 1718 and 1719). The plurality of apps 1718 and 1719 stored in the memory 1712 may be selected by the user input, and may be executed and operated.

According to an embodiment, the memory 1712 may include a database that may store information required for recognizing the user input. For example, the memory 1712 may include a log database for storing log information. In another example, the memory 1712 may include a personal database for storing user information.

According to an embodiment, the memory 1712 may store the plurality of apps 1718 and 1719, and the plurality of apps 1718 and 1719 may be loaded and operated. For example, the plurality of apps 1718 and 1719 stored in the memory 1712 may be loaded and operated by an execution manager module 1717 of the processor 1715. The plurality of apps 1718 and 1719 may include execution service modules 1718a and 1719a for performing functions. According to an embodiment, the plurality of apps 1718 and 1719 may perform a plurality of operations 1718b and 1719b (for example, sequences of states) through the execution service modules 1718a and 1719a to perform the function. That is, the execution service modules 1718a and 1719a may be activated by the execution manager module 1717 and may perform a plurality of operations 1718b and 1719b.

According to an embodiment, when the operations 1718b and 1719b of the apps 1718 and 1719 are performed, execution state screens according to execution of the operations 1718b and 1719b may be displayed on the display 1713. The execution state screens may be, for example, screens in the state in which the operations 1718b and 1719b are completed. In another example, the execution state screens may be screens in the state in which execution of the operations 1718b and 1719b are stopped (partial completion) (for example, in the state in which a parameter required for the operations 1718b and 1719b is not input).

The execution service modules 1718a and 1719a according to an embodiment may perform the operations 1718b and 1719b according to a path rule. For example, the execution service modules 1718a and 1719a may be activated by the execution manager module 1717, and may receive an execution request from the execution manager module 1717 according to the path rule and perform the operations 1718b and 1719b in response to the execution request to perform the function of the apps 1718 and 1719. When the performance of the operations 1718b and 1719b are completed, the execution service modules 1718a and 1719a may transmit completion information to the execution manager module 1717.

According to an embodiment, when the plurality of operations 1718b and 1719b is performed in the apps 1718 and 1719, the plurality of operations 1718b and 1719b may be sequentially performed. When execution of one operation (for example, operation 1 of the first app 1718 or operation 1 of the second app 1719) is completed, the execution service modules 1718a and 1719a may open the next operation (for example, operation 2 of the first app 1718 or operation 2 of the second app 1719) and transmit completion information to the execution manager module 1717. Here, opening a predetermined operation may be understood to be transitioning the predetermined operation to an executable state or preparing for execution of the predetermined operation. In other words, when the predetermined operation is not open, the corresponding operation cannot be executed. When the completion information is received, the execution manager module 1717 may transmit a request for performing the following operation (operation 2 of the first app 1718 or operation 2 of the second app 1719) to the execution service modules 1718a and 1719a. According to an embodiment, when the plurality of apps 1718 and 1719 is executed, the plurality of apps 1718 and 1719 may be sequentially executed. For example, when the last operation of the first app 1718 (for example, operation 3 of the first app 1718) is completely performed and completion information is received, the execution manager module 1717 may transmit a request for performing the first operation of the second app 1719 (for example, operation 1 of the second app 1719) to the execution service 1719a.

According to an embodiment, when the plurality of operations 1718b and 1719b are performed in the apps 1718 and 1719, the result screens according to the execution of the plurality of performed operations 1718b and 1719b may be displayed on the display 1713. According to an embodiment, only some of the plurality of result screens according to the execution of the plurality of performed operations 1718b and 1719b may be displayed on the display 1713.

According to an embodiment, the memory 1712 may store an intelligent app (for example, a speech recognition app) linked to the intelligent agent 1715a. The app linked to the intelligent agent 1715a may receive and process a user's utterance as a voice signal. According to an embodiment, the app linked to the intelligent agent 1715a may be operated by a particular input (for example, input through a hardware key, input through a touch screen, or a particular voice input) made through the input module 1711.

According to an embodiment, the processor 1715 may control the overall operation of the user terminal 1710. For example, the processor 1715 may receive a user input by controlling the input module 1711. The processor 1715 may display an image by controlling the display 1713. The processor 1715 may output a voice signal by controlling the speaker 1714. The processor 1715 may load or store required information by controlling the memory 1712.

According to an embodiment, the processor 1715 may include the intelligent agent 1715a, the execution manager module 1717, or the intelligent service module 1716. According to an embodiment, the processor 1715 may drive the intelligent agent 1715a, the execution manager module 1717, or the intelligent service module 1716 by executing commands stored in the memory 1712. Various modules mentioned in various embodiments of the disclosure may be implemented in hardware or software. The operation performed by the intelligent agent 1715a, the execution manager module 1717, or the intelligent service module 1716 in various embodiments of the disclosure may be understood as an operation performed by the processor 1715, for example when computer-executable codes loaded in memory 1712 are executed.

The intelligent agent 1715a according to an embodiment may generate a command for executing an app on the basis of the voice signal received as the user input. The execution manager module 1717 according to an embodiment may receive the generated command from the intelligent agent 1715a and select, execute, and operate the apps 1718 and 1719 stored in the memory 1712. According to an embodiment, the intelligent service module 1716 may manage user information and use the same for processing the user input.

The intelligent agent 1715a may process the user input received through the input module 1711 by transmitting the same to the intelligent server 1720.

According to an embodiment, the intelligent agent 1715a may preprocess the user input before transmitting the user input to the intelligent server 1720. According to an embodiment, in order to preprocess the user input, the intelligent agent 1715a may include an Adaptive Echo Canceller (AEC) module, a Noise Suppression (NS) module, an End-Point Detection (EPD) module, or an Automatic Gain Control (AGC) module. The AEC may remove an echo from the user input. The NS module may suppress background noise included in the user input. The EPD module may detect an end point of the user's voice included in the user input and detect a portion in which the user's voice exists. The AGC module may recognize the user input and control the volume of the user input to be suitable for processing. According to an embodiment, the intelligent agent 1715a may include all of the preprocessing elements for performance, but may include only some of the preprocessing elements in order to operate with low power according to another embodiment.

According to an embodiment, the intelligent agent 1715a may include a wakeup recognition module for recognizing a user's command. The wake-up recognition module may recognize a wake-up command of the user through the speech recognition module and, when the wake-up command is received, activate the intelligent agent 1715a to receive the user input. According to an embodiment, the wake-up recognition module of the intelligent agent 1715a may be implemented by a low-power processor (for example, a processor included in the audio codec). According to an embodiment, the intelligent agent 1715a may be activated according to the user input through a hardware key. When the intelligent agent 1715a is activated, an intelligent app (for example, the speech recognition app) linked to the intelligent agent 1715a may be executed.

According to an embodiment, the intelligent agent 1715a may include a speech recognition module for executing the user input. The speech recognition module may recognize the user input for performing the operation in the app. For example, the speech recognition module may recognize a limited range of user (speech) input (for example, an utterance such as "click" for performing a photographing operation when a camera app is executed) for performing the operation such as the wake-up command in the apps 1718 and 1719. The speech recognition module for assisting the intelligent server 1720 in recognizing the user input may recognize, for example, a user command that can be processed by the user terminal 1710, and may rapidly process the user command. According to an embodiment, the speech recognition module of the intelligent agent 1715a for executing the user input may be implemented by an app processor.

According to an embodiment, the speech recognition module (including the speech recognition module of the wake-up module) of the intelligent agent 1715a may recognize the user input through an algorithm for recognizing the speech. The algorithm used for recognizing the speech may be at least one of, for example, a Hidden Markov Model (HMM) algorithm, an Artificial Neural Network (ANN) algorithm, or a Dynamic Time Warping (DTW) algorithm.

According to an embodiment, the intelligent agent 1715a may convert the user voice input into text data. According to an embodiment, the intelligent agent 1715a may transfer the user speech to the intelligent server 1720 and receive converted text data. Accordingly, the intelligent agent 1715a may display the text data on the display 1713.

According to an embodiment, the intelligent agent 1715a may receive a path rule from the intelligent server 1720. According to an embodiment, the intelligent agent 1715a may transmit the path rule to the execution manager module 1717.

According to an embodiment, the intelligent agent 1715a may transmit an execution result log according to the path rule received from the intelligent server 1720 to the intelligent service module 1716, and the transmitted execution result log may be accumulated and managed in user preference information of the persona module (persona manager) 1716b.

The execution manager module 1717 according to an embodiment may receive the path rule from the intelligent agent 1715a and execute the app 1718 or 1719, and thus the app 1718 or 1719 may perform the operation 1718b or 1719b included in the path rule. For example, the execution manager module 1717 may transmit command information (for example, path rule information) for executing the operation 1718b and 1719b to the apps 1718 and 1719 and receive completion information of the operations 1718b and 1719b from the apps 1718 and 1719.

According to an embodiment, the execution manger module 1717 may transmit and receive command information (for example, path rule information) for executing the operations 1718b and 1719b of the apps 1718 and 1719 between the intelligent agent 1715a and the apps 1718 and 1719. The execution manager module 1717 may bind the apps 1718 and 1719 to be executed according to the path rule and transmit command information (for example, path rule information) of the operations 1718b and 1719b included in the path rule to the apps 1718 and 1719. For example, the execution manager module 1717 may sequentially transmit the operations 1718b and 1719b included in the path rule to the apps 1718 and 1719 and sequentially perform the operations 1718b and 1719b of the apps 1718 and 1719 according to the path rule.

According to an embodiment, the execution manager module 1717 may manage execution states of the operations 1718b and 1719b of the apps 1718 and 1719. For example, the execution manager module 1717 may receive information on the execution states of the operations 1718b and 1719b from the apps 1718 and 1719. When the execution states of the operations 1718b and 1719b are, for example, stopped states (partial completion) (for example, the states in which a parameter required for the operations 1718b and 1719b is not input), the execution manager module 1717 may transmit information on the stopped states to the intelligent agent 1715a. The intelligent agent 1715a may make a request for inputting required information (for example, parameter information) to the user on the basis of the received information. When the execution states of the operations 1718b and 1719b are, for example, operation states, the utterance may be received from the user and the execution manager module 1717 may transmit information on the apps 1718 and 1719 being executed and the execution states of the apps 1718 and 1719 to the intelligent agent 1715*a*. The intelligent agent 1715*a* may receive parameter information of the user's utterance through the intelligent server 1720 and transmit the received parameter information to the execution manager module 1717. The execution manager module 1717 may change the parameter of the operations 1718*b* and 1719*b* to a new parameter on the basis of the received parameter information.

According to an embodiment, the execution manager module 1717 may transfer parameter information included in the path rule to the apps 1718 and 1719. When the plurality of apps 1718 and 1719 are sequentially executed according to the path rule, the execution manager module 1717 may transfer parameter information included in the path rule from one app to another app.

According to an embodiment, the execution manager module 1717 may receive a plurality of path rules. The execution manager module 1717 may select a plurality of path rules on the basis of the user's utterance. For example, when the user's utterance specifies a predetermined app 1718 for performing a predetermined operation 1718*a* and does not specify another app 1719 for performing the remaining operation 1719*b*, the execution manager module 1717 may receive a plurality of different path rules for executing the same app 1718 (for example, a gallery app) for performing the predetermined operation 1718*a* and executing the other app 1719 (for example, a message app or a telegram app) for performing the remaining operation 1719*b*. The execution manager module 1717 may perform, for example, the same operations 1718*b* and 1719*b* of the plurality of path rules (for example, the same successive operations 1718*b* and 1719*b*). When the same operations are executed, the execution manager module 1717 may display a state screen for selecting different apps 1718 and 1719 included in the plurality of path rules on the display 1720.

According to an embodiment, the intelligent service module 1716 may include a context module 1716*a*, a persona module 1716*b*, and a proposal module 1716*c*.

The context module 1716*a* may collect the current states of the apps 1718 and 1719 from the apps 1718 and 1719. For example, the context module 1716*a* may receive context information indicating the current states of the apps 1718 and 1719 and collect the current states of the apps 1718 and 1719.

The persona module 1716*b* may manage personal information of the user who uses the user terminal 1710. For example, the persona module 1716*b* may collect usage information of the user terminal 1716 and the execution result to manage personal information of the user.

The proposal module 1716*c* may predict a user's intent and recommend a command to the user. For example, the proposal module 1716*c* may recommend a command to the user in consideration of the current state of the user (for example, time, place, situation, and app).

Figure 19:
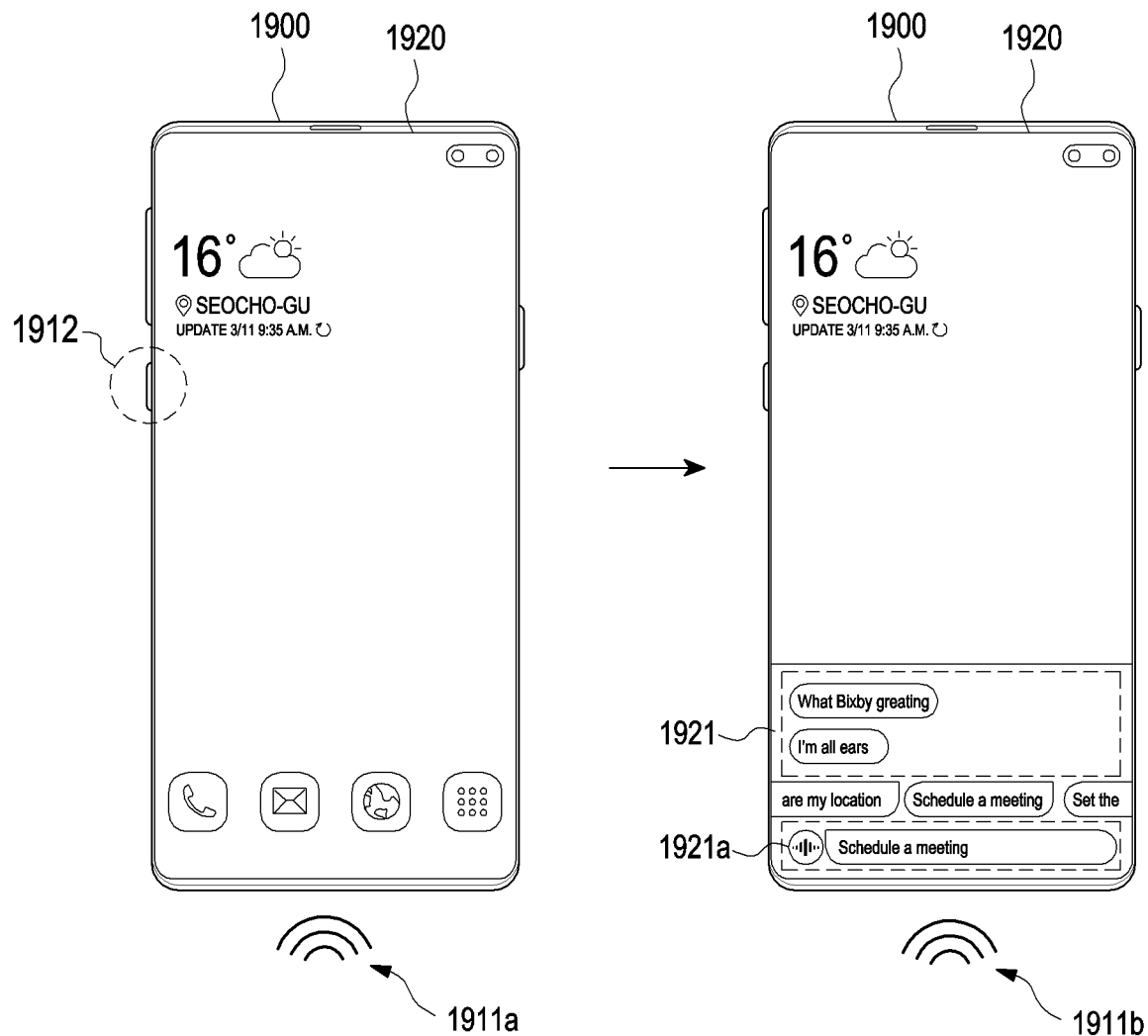
FIG. 19 illustrates an intelligent app of the user terminal according to an embodiment of the disclosure.

FIG. 19 illustrates an intelligent app of the user terminal according to an embodiment of the disclosure.

Referring to FIG. 19, a user terminal 1900 receives a user input and executes an intelligent app (for example, a speech recognition app) linked to the intelligent agent 1715*a*.

According to an embodiment, the user terminal 1900 may execute an intelligent app for recognizing a speech through a hardware key 1912. For example, when receiving the user input through the hardware key, as indicated by reference numeral 1912, the user terminal 1900 may display a User Interface (UI) 1921 of the intelligent app on a display 1920. The user may touch a speech recognition button 1921*a* in the UI 1921 of the intelligent app in order to input a speech, as indicated by reference numeral 1911*b*, in the state in which the UI 1921 of the intelligent app is displayed on the display 1920. In another example, to input the speech, the user may input the speech as indicated by reference numeral 1911*b* by continuously pressing the hardware key 1912.

According to an embodiment, the user terminal 1900 may execute the intelligent app for recognizing the speech through a microphone 1711*a*. For example, when a predetermined speech (for example, "wake up!") 1911*a* is input through the microphone 1711*a*, the user terminal 1900 may display the UI 1921 of the intelligent app on the display 1920.

Figure 20:
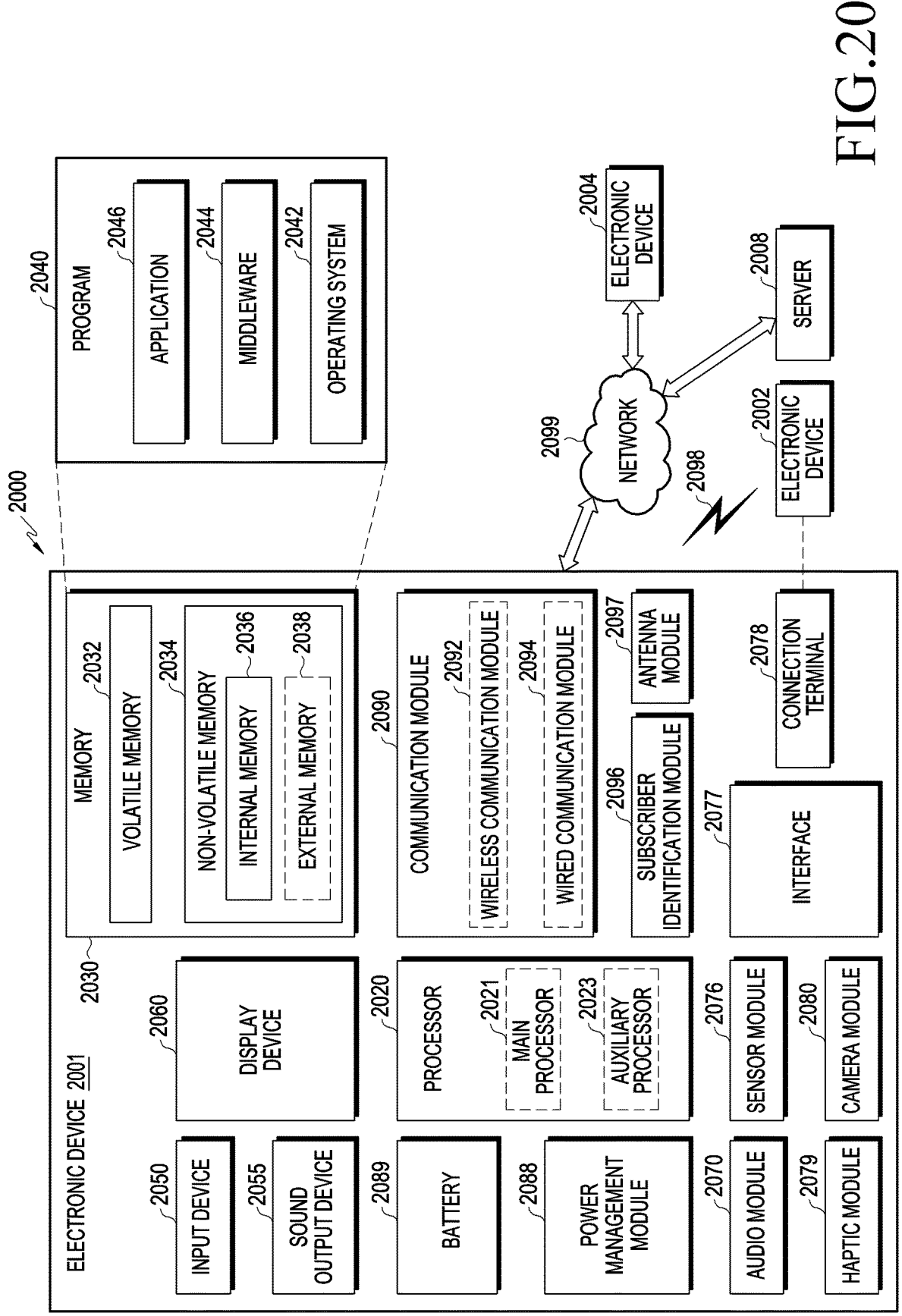
FIG. 20 is a block diagram illustrating an electronic device according to an embodiment of the disclosure.

FIG. 20 is a block diagram illustrating an electronic device 2001 within a network environment 2000 according to an embodiment. Referring to FIG. 20, the electronic device 2001 (for example, the electronic device 101 of FIG. 1) may communicate with an electronic device 2002 through a network 2098 (for example, a short-range wireless communication network) or communicate with an electronic device 2004 or a server 2008 through a second network 2099 (for example, a long-range wireless communication network) in the network environment 2000. According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In some embodiments, at least one of the elements (for example, the display device 2060 or the camera module 2080) may be omitted or one or more other elements may be added to the electronic device 2001. In some embodiments, some of the elements may be implemented as a single integrated circuit. For example, the sensor module 2076 (for example, a fingerprint sensor, an iris sensor, or an illumination sensor) may be implemented while being embedded into the display device 2060 (for example, the display).

The processor 2020 may control at least one other element (for example, a hardware or software element) of the electronic device 2001 connected to the processor 2020 by executing, for example, software (for example, the program 2040) and may perform various data processing or calculations. According to an embodiment, as at least part of the data processing or calculations, the processor 2020 may load a command or data received from another element (for example, the sensor module 2076 or the communication module 2090) to the volatile memory 2032, process the command or data stored in the volatile memory 2032, and store the resultant data in the nonvolatile memory 2034. According to an embodiment, the processor 2020 may include a main processor 2021 (for example, a central processing unit or an application processor) and an auxiliary processor 2023 (for example, a graphic processing unit, an image signal processor, a sensor hub processor, or a communication processor) which may operate independently from the main processor or together with the main processor. Additionally or alternatively, the auxiliary processor 2023 may use lower power than the main processor 2021 or may be configured to specialize in a predetermined function. The auxiliary processor 2023 may be implemented separately from or as a portion of the main processor 2021.

The auxiliary processor 2023 may control at least a portion of the functions or states related to at least one of the elements (for example, the display device 2060, the sensor module 2076, or the communication module 2090) of the electronic device 2001 on behalf of the main processor 2021 while the main processor 2021 is in an inactive (for example, sleep) state or together with the main processor 2021 while the main processor 2021 is in an active (for example, application execution) state. According to an embodiment, the auxiliary processor 2023 (for example, the image signal processor or the communication processor) may be implemented as a portion of other functionally relevant elements (for example, the camera module 2080 or the communication module 2090).

The memory 2030 may store various pieces of data used by at least one element (for example, the processor 2020 or the sensor module 2076) of the electronic device 2001. The data may include, for example, software (for example, the program 2040) and input data or output data on a command related thereto. The memory 2030 may include volatile memory 2032 or nonvolatile memory 2034.

The program 2040 may be stored and loaded in the memory 2030 as software and may include, for example, an operating system 2042, middleware 2044, or an application 2046.

The input device 2050 may receive a command or data to be used by the element (for example, the processor 2020) of the electronic device 2001 from the outside (for example, the user) of the electronic device 2001. The input device 2050 may include, for example, a microphone, a mouse, or a keyboard.

The sound output device 2055 may output a sound signal to be audible to a user of the electronic device 2001. The sound output device 2055 may include, for example, a speaker or a receiver. The speaker may be used for general purposes, such as reproducing multimedia or recording and the receiver may be used for receiving an incoming call. According to an embodiment, the receiver may be implemented separately from the speaker or as a portion of the speaker.

The display device 2060 may visually provide information to the user of the electronic device 2001. The display device 2060 may include, for example, a display, a hologram device, a project, and a control circuit for controlling the corresponding device. According to an embodiment, the display device 2060 may include a touch circuit configured to detect a touch or a sensor circuit (for example, a pressure sensor) configured to measure the intensity of force generated by the touch.

The audio module 2070 may convert a sound into an electrical signal or, conversely, convert an electrical signal into a sound. According to an embodiment, the audio module 2070 may acquire a sound through the input device 2050 or output a sound through the sound output device 2055 or an external electronic device (for example, the electronic device 2002) (for example, a speaker or headphones) directly or wirelessly connected to the electronic device 2001.

The sensor module 2076 may detect an operational state (for example, a power or temperature) of the electronic device 2001 or an external environmental state (for example, a user state) and generate an electrical signal or a data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illumination sensor.

The interface 2077 may support one or more predetermined protocols that can be used for the direct or wireless connection between the electronic device 2001 and an external electronic device (for example, the electronic device 2002). According to an embodiment, the interface 2077 may include, for example, a High-Definition Multimedia Interface (HDMI), a Universal Serial Bus (USB) interface, an SD card interface, or an audio interface.

A connection terminal 2078 may include a connector which physically connects the electronic device 2001 to the external electronic device (for example, the electronic device 2002). According to an embodiment, the connection terminal 2078 may include, for example, an HDMI connector, a USB connector, an SD card connector, or an audio connector (for example, a headphone connector).

The haptic module 2079 may convert an electric signal into mechanical stimulation (for example, vibration or motion) or electric stimulation, which the user recognizes through a sense of touch or kinesthesia. According to an embodiment, the haptic module 2079 may include, for example, a motor, a piezoelectric element, or an electrostimulation device.

The camera module 2080 may capture a still image and a moving image. According to an embodiment, the camera module 2080 may include one or more lenses, image sensors, image signal processors, or flashes.

The power management module 2088 may mange the power supplied to the electronic device 2001. According to an embodiment, the power management module 2088 may be implemented as at least a portion of, for example, a Power Management Integrated Circuit (PMIC).

The battery 2089 may supply power to at least one element of the electronic device 2001. According to an embodiment, the battery 2089 may include, for example, a non-rechargeable primary cell, a rechargeable secondary cell, or a fuel cell.

The communication module 2090 may support establishment of a direct (for example, wired) communication channel or a wireless communication channel between the electronic device 2001 and the external electronic device (for example, the electronic device 2002, the electronic device 2004, or the server 2008) and communication through the established communication channel. The communication module 2090 may include one or more communication processors that operate independent from the processor 2020 (for example, the application processor) and support direct (for example, wired) communication or wireless communication. According to an embodiment, the communication module 2090 may include a wireless communication module 2092 (for example, a cellular communication module, a short-range wireless communication module, or a Global Navigation Satellite System (GNSS) communication module) or a wired communication module 2094 (for example, a Local Area Network (LAN) communication module or a power line communication module). Among the communication modules, the corresponding communication module may communicate with the external electronic device through a first network 2098 (for example, a short-range communication network such as Bluetooth, Wi-Fi direct or Infrared Data Association (IrDA)) or a second network 2099 (for example, a long-range communication network such as a cellular network, Internet, or a computer network (for example, a LAN or WAN)). Such various types of communication modules may be integrated into one element (for example, a single chip) or may be implemented as a plurality of separate elements (for example, a plurality of chips). The wireless communication module 2092 may identify and authenticate the electronic device 2001 within a communication network such as the first network 2098 or the second network 2099 through subscriber information (for example, an international mobile subscriber identification (IMSI)) stored in the subscriber identification module 2096.

The antenna module 2097 may transmit signals or power to the outside (for example, to an external electronic device) or receive the same from the outside. According to an embodiment, the antenna module 2097 may include one or more antennas, and at least one antenna suitable for a communication scheme used for a communication network such as the first network 2098 or the second network 2099 may be selected by, for example, the communication module 2090. The signals or power may be transmitted or received between the communication module 2090 and the external electronic device through at least one selected antenna.

At least some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, instructions or data) therebetween.

According to an embodiment, a command or data may be transmitted or received between the electronic device 2001 and the external electronic device 2004 through the server 2008 connected to the second network 2099. Each of the electronic devices 2002 and 2004 may be a device that is the same type as or a different type from that of the electronic device 2001. According to an embodiment, all or some of the operations performed by the electronic device 2001 may be executed by one or more external electronic devices among the external electronic devices 2002, 2004, and 2008. For example, when the electronic device 2001 performs any function or service automatically or in response to a request from a user or another device, the electronic device 2001 may make a request for performing at least some of the functions or services to one or more external electronic devices instead of performing the functions or services by itself, or may additionally make the request. The one or more external electronic devices receiving the request may perform at least some of the requested functions or services or an additional function or service related to the request and may transfer the result thereof to the electronic device 2001. The electronic device 2001 may provide the result or additionally process the result and provide the processed result as at least a portion of a response to the request. To this end, for example, cloud-computing, distributed-computing, or client-server-computing technology may be used. The electronic device according to various embodiments disclosed in this document may be various types of electronic devices. The electronic device may include, for example, at least one of a portable communication device (for example, a smart phone), a computer device, a portable multimedia device, a portable medical device, a camera, a wearable device, and a home appliance. The electronic device according to an embodiment of this document is not limited to the above-described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B," "one or more of A and or B," "A, B, or C," or "one or more of A, B and or C" may include all possible combinations of them. The expression "a first," "a second," "the first," or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic," "logical block," "component," "circuit," or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 2040) including an instruction stored in machine-readable storage media (e.g., internal memory 2036 or external memory 2038). The machine is a device that calls the stored instruction from the storage media and can operate according to the called instruction, and may include an electronic device (e.g., electronic device 101) according to the disclosed embodiments. The instruction, when executed by a processor (e.g., processor 201), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

An electronic device according to various embodiments disclosed herein may be various types of devices. The electronic device may, for example, include at least one of a portable communication device (e.g., smart phone) a computer device, a portable multimedia device, a portable medical device, a camera, a wearable device, and a home appliance. The electronic device according to embodiments of the disclosure is not limited to the above-described devices.

The term "module" as used herein may include a unit consisting of hardware, software, or firmware, and may, for example, be used interchangeably with the term "logic," "logical block," "component," "circuit," or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 2040) including an instruction stored in machine-readable storage media (e.g., internal memory 2036 or external memory 2038). The machine is a device that calls the stored instruction from the storage media and can operate according to the called instruction, and may include an electronic device (e.g., electronic device 101) according to the disclosed embodiments. The instruction, when executed by a processor (e.g., processor 201, 2020), may cause the processor to execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, a storage medium storing instructions is provided. The instructions may be configured to cause at least one processor to, when executed by the processor, perform at least one operation. The at least one operation may include, in a method of controlling speech recognition by an electronic device, an operation of receiving a speech input signal through a microphone, an operation of acquiring speech output data to be output in response to the received speech input signal, an operation of identifying at least one predetermined condition to adjust a speech output rate (speech rate) for the speech output data, an operation of generating a speech signal of which the speech output rate for the speech output data is adjusted, based on the predetermined condition, and an operation of outputting the generated speech signal through a speaker.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

What is claimed is:

1. An electronic device comprising:
a speaker;
a microphone;
a processor; and
memory that stores computer-readable instructions,
wherein the processor, when executing the computer-readable instructions, is configured to control the electronic device to:
receive a speech input signal through the microphone,
obtain speech output data to be output in response to the received speech input signal,
identify a specific condition for an adjustment of a speech rate of a portion of the speech output data,
when the specific condition is a first predetermined condition, generate a first speech signal of the speech output data comprising the portion of the speech output data having an adjusted speech rate based on whether the portion of the speech output data is a consonant or a vowel and a remaining portion of the speech output data having a speech rate that is different from the adjusted speech rate, when the specific condition is a second predetermined condition, generate a second speech signal of the speech output data comprising the portion of the speech output data having the adjusted speech rate based on whether the portion of the speech output data is a predetermined syllable in a predetermined word and the remaining portion of the speech output data having the speech rate that is different from the adjusted speech rate, and output the first speech signal or the second speech signal through the speaker.

2. The electronic device of claim 1, wherein the speech output data is generated by performing Automatic Speech Recognition (ASR) or Natural Language Understanding (NLU) processing on the speech input signal.

3. The electronic device of claim 2, wherein the speech output data is generated by an external server performing the ASR or NLU processing on the speech input signal.

4. The electronic device of claim 1, wherein the processor, when executing the computer-readable instructions, is configured to control the electronic device to generate the second speech signal comprising the portion of the speech output data having the adjusted speech rate by inserting a pause interval of a predetermined length between syllables included in the portion of the speech output data.

5. The electronic device of claim 1, wherein the processor, when executing the computer-readable instructions, is configured to control the electronic device to identify a user of the electronic device from the speech input signal and generate the first or second speech signal of the speech output data based on identity of the user.

6. A method of controlling speech recognition by an electronic device, the method comprising:

receiving a speech input signal through a microphone;

obtaining speech output data to be output in response to the received speech input signal;

identifying a specific condition for an adjustment of a speech rate of a portion of the speech output data;

when the specific condition is a first predetermined condition, generating a first speech signal of the speech output data comprising the portion of the speech output data having an adjusted speech rate based on whether the portion of the speech output data is a consonant or a vowel and a remaining portion of the speech output data having a speech rate that is different from the adjusted speech rate;

when the specific condition is a second predetermined condition, generating a second speech signal of the speech output data comprising the portion of the speech output data having the adjusted speech rate based on whether the portion of the speech output data is a predetermined syllable in a predetermined word and the remaining portion of the speech output data having the speech rate that is different from the adjusted speech rate, and outputting the first speech signal or the second speech signal through a speaker of the electronic device.

7. The method of claim 6, wherein the speech output data is generated by performing Automatic Speech Recognition (ASR) or Natural Language Understanding (NLU) processing on the speech input signal.

8. The method of claim 7, wherein the speech output data is generated by an external server performing the ASR and/or NLU processing on the speech input signal.

9. The method of claim 6, wherein generating the second speech signal of the speech output data comprises inserting a pause interval of a predetermined length between syllables included in the portion of the speech output data.

10. The method of claim 6, further comprising:

identifying a user of the electronic device from the received speech input signal; and generating the first or second speech signal of the speech output data based on identity of the user.

* * * * *